United States Patent
Zheng et al.

(10) Patent No.: US 9,641,853 B2
(45) Date of Patent: May 2, 2017

(54) METHOD AND APPARATUS OF DEPTH PREDICTION MODE SELECTION

(71) Applicants: Futurewei Technologies, Inc., Plano, TX (US); Santa Clara University, Santa Clara, CA (US)

(72) Inventors: Jianhua Zheng, Beijing (CN); Zhouye Gu, Santa Clara, CA (US); Nam Ling, San Jose, CA (US); Chen-Xiong Zhang, Plano, TX (US)

(73) Assignee: Futurewei Technologies, Inc., Plano, TX (US)

(*) Notice: Subject to any disclaimer, the term of this patent is extended or adjusted under 35 U.S.C. 154(b) by 455 days.

(21) Appl. No.: 14/253,465

(22) Filed: Apr. 15, 2014

(65) Prior Publication Data

US 2014/0307787 A1     Oct. 16, 2014

Related U.S. Application Data

(60) Provisional application No. 61/812,124, filed on Apr. 15, 2013.

(51) Int. Cl.
*H04N 19/103* (2014.01)
*H04N 19/11* (2014.01)
*H04N 19/19* (2014.01)
*H04N 19/597* (2014.01)
*H04N 19/176* (2014.01)
*H04N 19/14* (2014.01)
*H04N 19/149* (2014.01)

(52) U.S. Cl.
CPC ........... *H04N 19/19* (2014.11); *H04N 19/103* (2014.11); *H04N 19/14* (2014.11); *H04N 19/176* (2014.11); *H04N 19/597* (2014.11); *H04N 19/149* (2014.11)

(58) Field of Classification Search
CPC combination set(s) only.
See application file for complete search history.

(56) References Cited

U.S. PATENT DOCUMENTS

| | | |
|---|---|---|
| 2009/0074058 A1 | 3/2009 | Zhang et al. |
| 2011/0292043 A1 | 12/2011 | Kim et al. |
| 2012/0177118 A1 | 7/2012 | Karczewicz et al. |
| 2014/0064359 A1* | 3/2014 | Rapaka ............ H04N 19/00024 375/240.02 |

(Continued)

OTHER PUBLICATIONS

Schwarz, H., et al., Description of 3D Video Technology Proposal by Fraunhofer HHI (HEVC compatible; configuration A), Input Contribution to ISO/IEC JCT1/SC29/WG11 MPEG2011/M22570 (Nov. 2011).*

(Continued)

*Primary Examiner* — William C Vaughn, Jr.
*Assistant Examiner* — Lindsay Uhl
(74) *Attorney, Agent, or Firm* — Futurewei Technologies, Inc.

(57) ABSTRACT

There is disclosed a method, apparatus and computer program product for prediction mode selection for coding a block of a depth map. An ordered list of coding modes is obtained, wherein the ordered list of coding modes comprises a plurality of coding modes. And whether a depth modeling mode and/or a region boundary chain mode is to be added into the ordered list of coding modes in accordance with a decision condition is determined.

18 Claims, 9 Drawing Sheets

(56) References Cited

U.S. PATENT DOCUMENTS

| | | | | |
|---|---|---|---|---|
| 2014/0294061 A1* | 10/2014 | Zhang | ............... | H04N 19/597 375/240.02 |
| 2014/0298179 A1* | 10/2014 | Chen | ............... | H04L 67/2823 715/730 |
| 2014/0301454 A1* | 10/2014 | Zhang | ............ | H04N 13/0048 375/240.12 |
| 2015/0245061 A1* | 8/2015 | Chen | ............... | H04N 19/597 375/240.13 |
| 2016/0050419 A1* | 2/2016 | Zhao | ............... | H04N 19/597 375/240.12 |

OTHER PUBLICATIONS

Heo, J. et al., CE6.h Region Boundary Chain Coding for Depth-map, Input Document to Joint Collaborative Team on 3D Video Coding Extension Development of ITU-T SG 16 WP 3 and ISO/IEC JTC 1/SC 29/WG 11, Doc. No. JCT2-A0070 (Jul. 2012).*

Gu, Zhouye, et al., "D-CE6.h related: Fast Intra Prediction Mode Selection for Intra Depth Map Coding", Input Document to Joint Collaborative Team on 3D Video Coding Extension Development of ITU-T SG 16 WP 3 and ISO/IEC JTC 1/SC 29/WG 11, 4th Meeting: Incheon, Seoul, JCT3V-D0175, pp. 1-5, (Apr. 13, 2013).*

Telecommunication Standardization Sector of ITU; Series H: Audiovisual and Multimedia Systems Infrastructure of audiovisual services—Coding of moving video; Advanced video coding for generic audiovisual services H.264 (Jan. 2012); total: 680 pages.

Joint Collaborative Team on 3D Video Coding Extension Development of ITU-T SG 16 WP3 and ISO/IEC JTC 1/SC 29/WG11; 3D-HEVC Test Model 2; Document: JCT3V-B1005_d0, dated Oct. 13-10, 2012, total: 118 pages.

* cited by examiner

| | video 0 | video 1 | video 2 | video PSNR / video bitrate | video PSNR / total bitrate | synth PSNR / total bitrate | enc time | dec time | ren time |
|---|---|---|---|---|---|---|---|---|---|
| Balloons | 0.0% | 0.0% | 0.0% | 0.0% | 0.0% | 0.0% | 75.7% | 102.7% | 107.8% |
| Kendo | 0.0% | 0.0% | 0.0% | 0.0% | 0.0% | 0.0% | 75.9% | 104.4% | 104.3% |
| Newspaper_CC | 0.0% | 0.0% | 0.0% | 0.0% | 0.0% | 0.1% | 83.4% | 96.7% | 99.5% |
| GT_Fly | 0.0% | 0.0% | 0.0% | 0.0% | 0.0% | 0.0% | 79.7% | 102.1% | 104.3% |
| Poznan_Hall2 | 0.0% | 0.0% | 0.0% | 0.0% | 0.0% | 0.1% | 67.8% | 103.1% | 104.2% |
| Poznan_Street | 0.0% | 0.0% | 0.0% | 0.0% | 0.0% | 0.0% | 76.3% | 103.5% | 104.5% |
| Undo_Dancer | 0.0% | 0.0% | 0.0% | 0.0% | 0.0% | 0.0% | 79.1% | 99.9% | 104.7% |
| 1024x768 | 0.0% | 0.0% | 0.0% | 0.0% | 0.0% | 0.0% | 78.3% | 101.3% | 103.9% |
| 1920x1088 | 0.0% | 0.0% | 0.0% | 0.0% | 0.0% | 0.0% | 75.7% | 102.2% | 104.4% |
| average | 0.00% | 0.00% | 0.00% | 0.00% | -0.02% | 0.04% | 76.9% | 101.8% | 104.2% |

*FIG. 9*

METHOD AND APPARATUS OF DEPTH PREDICTION MODE SELECTION

CROSS-REFERENCE TO RELATED APPLICATIONS

The present application claims priority to U.S. Provisional Patent Application No. 61/812,124 filed on Apr. 15, 2013 by Zhouye Gu et al. and entitled "METHOD OF FAST DEPTH INTRA CODING", which is incorporated herein by reference as if reproduced in its entirety.

TECHNICAL FIELD

The present application relates generally to an apparatus, a method and a computer program for video coding and decoding.

BACKGROUND

The amount of video data needed to depict even a relatively short film can be substantial, which may result in difficulties when the data is to be streamed or otherwise communicated across a communications network with limited bandwidth capacity. As a result, video data is generally compressed before being communicated across modern day telecommunications networks. Video compression devices often use software and/or hardware at the source to code the video data prior to transmission, thereby decreasing the quantity of data needed to represent digital video images. The compressed data is then received at the destination by a video decompression device that decodes the video data. With limited network resources and ever increasing demands of higher video quality, compression and decompression techniques that improve compression ratio with little to no sacrifice in image quality are desirable.

A video coding system may comprise an encoder that transforms an input video into a compressed representation suited for storage/transmission and a decoder that can uncompress the compressed video representation back into a viewable form. The encoder may discard some information in the original video sequence in order to represent the video in a more compact form, for example, to enable the storage of the video information at a smaller volume and transmission of the video information at a lower bitrate than otherwise might be needed.

Various technologies for providing three-dimensional (3D) video content are currently investigated and developed. Especially, intense studies have been focused on various multiview applications wherein a viewer is able to see only one pair of stereo video from a specific viewpoint and another pair of stereo video from a different viewpoint. One of the most feasible approaches for such multiview applications has turned out to be such wherein only a limited number of input views, e.g. a mono or a stereo video plus some supplementary data, is provided to a decoder side and all required views are then rendered (i.e. synthesized) locally by the decoder to be displayed on a display.

When encoding 3D video content, video compression systems, such as Advanced Video Coding standard H.264/AVC or the Multiview Video Coding MVC extension of H.264/AVC, High Efficient Video Coding standard HEVC or Multiview extension of HEVC plus depth, or 3D extension of HEVC may be used.

SUMMARY

This invention proceeds from the consideration that at least for some scenarios of encoding a block of a depth map, adding a block partition mode (BPM), e.g. a depth modeling mode (DMM) and/or a region boundary chain mode (RBCM), into an ordered list of coding modes can be avoided to reduce encoding complexity. For example, for encoding a smooth block of a depth map, a BPM can be excluded to be added into a full-rate distortion (full-RD) search list, i.e. less entries listed in the full-RD search list; thus complexity related to a full-RD cost calculation of entries in the list can be reduced.

According to a first aspect, there is provided a method of prediction mode selection for coding a block of a depth map. The method includes obtaining an ordered list of coding modes which includes a plurality of coding modes; and determining whether a region boundary chain mode (RBCM) is to be added into the ordered list of coding modes in accordance with a decision condition.

According to a second aspect, there is provided an apparatus. The apparatus includes a module for obtaining an ordered list of coding modes which includes a plurality of coding modes; and a module for determining whether a region boundary chain mode (RBCM) is to be added into the ordered list of coding modes in accordance with a decision condition.

According to a third aspect, there is provided a method of prediction mode selection for coding a block of a depth map. The method includes obtaining an ordered list of coding modes which includes a plurality of coding modes; and determining whether a block partition mode (BPM) is to be added into the ordered list of coding modes in accordance with a decision condition based on a variance of the block of the depth map.

According to a fourth aspect, there is provided an apparatus. The apparatus includes a module for obtaining an ordered list of coding modes which includes a plurality of coding modes; and a module for determining whether a block partition mode (BPM) is to be added into the ordered list of coding modes in accordance with a decision condition based on a variance of a block of a depth map.

In a possible implementation form of above mentioned aspects, the decision condition may be based on a checking of a mode of the ordered list of coding modes. The mode being checked may be a priority mode, a first mode, or a second mode of the ordered list of coding modes. For example, whether a priority mode, a first mode, or a second mode of the ordered list of coding modes is a flat coding mode. In case of a flat coding mode, the block to be encoded is likely smooth, thus avoiding adding BPM into the ordered list of coding mode can reduce encoding complexity.

In another possible implementation form of above mentioned aspects, the decision condition may be based on both a checking of a mode of the ordered list of coding modes and a checking of a variance of a block of a depth map. For example, whether a priority mode, a first mode, or a second mode of the ordered list of coding modes is a flat coding mode, and comparing the variance of the block with a threshold. Compared with only checking a mode of the ordered list of coding modes, the further checking of the variance can enhance the possibility of correctly excluding adding BPM into the ordered list of coding modes, and diminish encoding quality loss resulted from falsely excluding BPM from adding into the ordered list of coding modes.

These and other aspects of the invention will be apparent from and illuminated by the embodiment(s) described below.

BRIEF DESCRIPTION OF THE DRAWINGS

For a more complete understanding of this disclosure, reference is now made to the following brief description.

FIG. 5b illustrates an embodiment of an apparatus implementing the method illustrated by FIG. 5a.

FIG. 6b illustrates an embodiment of an apparatus implementing the method illustrated by FIG. 6a.

FIG. 7b illustrates an embodiment of an apparatus implementing the method illustrated by FIG. 7a.

FIG. 8b illustrates an embodiment of an apparatus implementing the method illustrated by FIG. 8a.

FIG. 9 illustrates an experimental result of another embodiment of a mode selection method.

DETAILED DESCRIPTION

Figure 1:
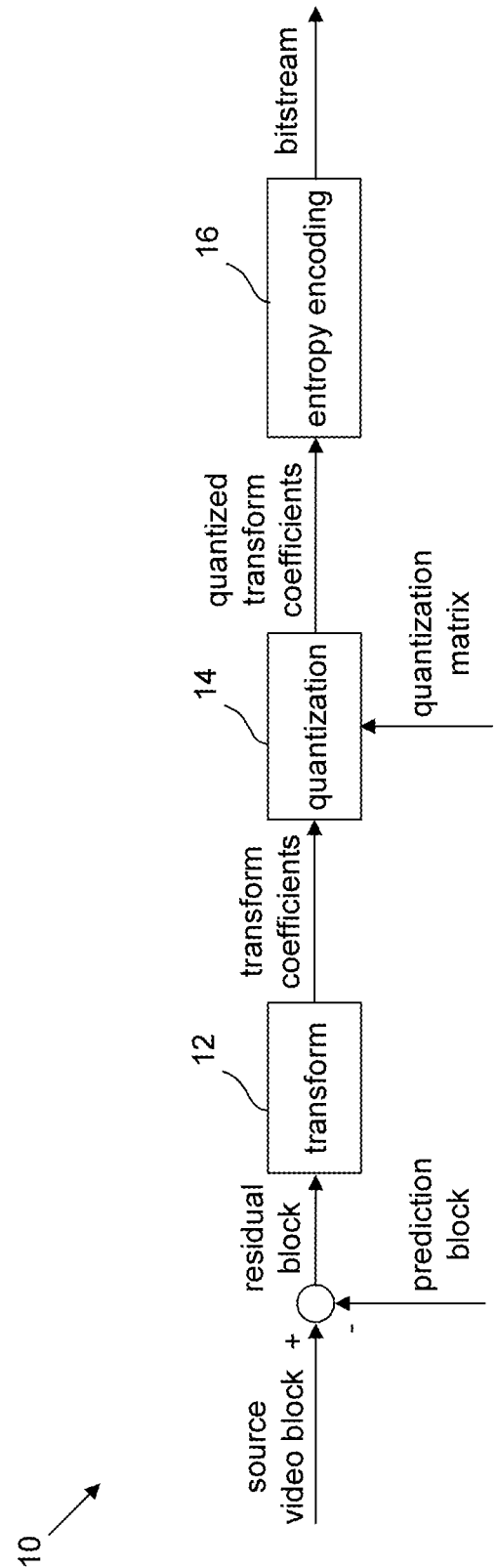
FIG. 1 illustrates part of an exemplary video encoder.

It should be understood at the outset that, although an illustrative implementation of one or more embodiments are provided below, the disclosed systems and/or methods may be implemented using any number of techniques. The disclosure should in no way be limited to the illustrative implementations, drawings, and techniques illustrated below, including the exemplary designs and implementations illustrated and described herein, but may be modified within the scope of the appended claims along with their full scope of equivalents.

In the following, several embodiments of the invention will be described in the context of one video coding arrangement. It is to be noted, however, that the invention is not limited to this particular arrangement. In fact, the different embodiments have applications widely used in any environment where improvement of reference picture handling is required. For example, the invention may be applicable to video coding systems like streaming systems, DVD players, digital television receivers, personal video recorders, systems and computer programs on personal computers, handheld computers and communication devices, as well as network elements such as transcoders and cloud computing arrangements where video data is handled.

The H.264/AVC standard was developed by the Joint Video Team (JVT) of the Video Coding Experts Group (VCEG) of the Telecommunications Standardization Sector of International Telecommunication Union (ITU-T) and the Moving Picture Experts Group (MPEG) of International Organization for Standardization (ISO)/International Electrotechnical Commission (IEC). The H.264/AVC standard is published by both parent standardization organizations, and it is referred to as ITU-T Recommendation H.264 and ISO/IEC International Standard 14496-10, also known as MPEG-4 Part 10 Advanced Video Coding (AVC). There have been multiple versions of the H.264/AVC standard, each integrating new extensions or features to the specification. These extensions include Scalable Video Coding (SVC) and Multiview Video Coding (MVC).

There is a currently ongoing standardization project of High Efficiency Video Coding (HEVC) by the Joint Collaborative Team-Video Coding (JCT-VC) of VCEG and MPEG. For a detailed overview of the HEVC standard, reference is made to an Institute of Electrical and Electronics Engineers (IEEE) paper titled "Overview of the High Efficiency Video Coding (HEVC) Standard" which is accessible from IEEE website (http://ieeexplore.ieee.org/Xplore/home.jsp) with the Digital Object Identifier "10.1109/TCSVT.2012.2221191". This IEEE paper is incorporated herein by reference as if reproduced in its entirety.

Some key definitions, bitstream and coding structures, and concepts of H.264/AVC and HEVC are described in this section as an example of a video encoder, decoder, encoding method, decoding method, and a bitstream structure, wherein the embodiments may be implemented. Some of the key definitions, bitstream and coding structures, and concepts of H.264/AVC are the same as in a draft HEVC standard—hence, they are described below jointly. The aspects of the invention are not limited to H.264/AVC or HEVC, but rather the description is given for one possible basis on top of which the invention may be partly or fully realized.

Similarly to many earlier video coding standards, the bitstream syntax and semantics as well as the decoding process for error-free bitstreams are specified in H.264/AVC and HEVC. The encoding process is not specified, but encoders must generate conforming bitstreams. Bitstream and decoder conformance can be verified with the Hypothetical Reference Decoder (HRD). The standards contain coding tools that help in coping with transmission errors and losses, but the use of the tools in encoding may be optional and no decoding process has been specified for erroneous bitstreams.

The elementary unit for the input to an H.264/AVC or HEVC encoder and the output of an H.264/AVC or HEVC decoder, respectively, is a picture. In H.264/AVC and HEVC, a picture may either be a frame or a field. A frame comprises a matrix of luma samples and corresponding chroma samples. A field is a set of alternate sample rows of a frame and may be used as encoder input, when the source signal is interlaced. Chroma pictures may be subsampled when compared to luma pictures. For example, in the 4:2:0 sampling pattern the spatial resolution of chroma pictures is half of that of the luma picture along both coordinate axes.

In H.264/AVC, a macroblock is a 16×16 block of luma samples and the corresponding blocks of chroma samples. For example, in the 4:2:0 sampling pattern, a macroblock contains one 8×8 block of chroma samples per each chroma component. In H.264/AVC, a picture is partitioned to one or more slice groups, and a slice group contains one or more slices. In H.264/AVC, a slice consists of an integer number of macroblocks ordered consecutively in the raster scan within a particular slice group.

In a draft HEVC standard, video pictures are divided into coding units (CU) covering the area of the picture. A CU consists of one or more prediction units (PU) defining the prediction process for the samples within the CU and one or more transform units (TU) defining the prediction error coding process for the samples in the CU. Typically, a CU consists of a square block of samples with a size selectable from a predefined set of possible CU sizes. A CU with the maximum allowed size is typically named as LCU (largest coding unit) and the video picture is divided into non-overlapping LCUs. An LCU can be further split into a combination of smaller CUs, e.g. by recursively splitting the LCU and resultant CUs. Each resulting CU typically has at least one PU and at least one TU associated with it. Each PU and TU can further be split into smaller PUs and TUs in order to increase granularity of the prediction and prediction error coding processes, respectively. The PU splitting can be realized by splitting the CU into four equal size square PUs or splitting the CU into two rectangle PUs vertically or horizontally in a symmetric or asymmetric way. The division of the image into CUs, and division of CUs into PUs and TUs is typically signalled in the bitstream allowing the decoder to reproduce the intended structure of these units.

In a draft HEVC standard, a picture can be partitioned in tiles, which are rectangular and contain an integer number of LCUs. In a draft HEVC standard, the partitioning to tiles forms a regular grid, where heights and widths of tiles differ from each other by one LCU at the maximum. In a draft HEVC, a slice consists of an integer number of CUs. The CUs are scanned in the raster scan order of LCUs within tiles or within a picture, if tiles are not in use. Within an LCU, the CUs have a specific scan order.

In a Working Draft (WD) 5 of HEVC, some key definitions and concepts for picture partitioning are defined as follows. A partitioning is defined as the division of a set into subsets such that each element of the set is in exactly one of the subsets.

A basic coding unit in a HEVC WD5 is a treeblock. A treeblock is an N×N block of luma samples and two corresponding blocks of chroma samples of a picture that has three sample arrays, or an N×N block of samples of a monochrome picture or a picture that is coded using three separate colour planes. A treeblock may be partitioned for different coding and decoding processes. A treeblock partition is a block of luma samples and two corresponding blocks of chroma samples resulting from a partitioning of a treeblock for a picture that has three sample arrays or a block of luma samples resulting from a partitioning of a treeblock for a monochrome picture or a picture that is coded using three separate colour planes. Each treeblock is assigned a partition signalling to identify the block sizes for intra or inter prediction and for transform coding. The partitioning is a recursive quadtree partitioning. The root of the quadtree is associated with the treeblock. The quadtree is split until a leaf is reached, which is referred to as the coding node. The coding node is the root node of two trees, the prediction tree and the transform tree. The prediction tree specifies the position and size of prediction blocks. The prediction tree and associated prediction data are referred to as a prediction unit. The transform tree specifies the position and size of transform blocks. The transform tree and associated transform data are referred to as a transform unit. The splitting information for luma and chroma is identical for the prediction tree and may or may not be identical for the transform tree. The coding node and the associated prediction and transform units form together a coding unit.

In a HEVC WD5, pictures are divided into slices and tiles. A slice may be a sequence of treeblocks but (when referring to a so-called fine granular slice) may also have its boundary within a treeblock at a location where a transform unit and prediction unit coincide. Treeblocks within a slice are coded and decoded in a raster scan order. For the primary coded picture, the division of each picture into slices is a partitioning.

In a HEVC WD5, a tile is defined as an integer number of treeblocks co-occurring in one column and one row, ordered consecutively in the raster scan within the tile. For the primary coded picture, the division of each picture into tiles is a partitioning. Tiles are ordered consecutively in the raster scan within the picture. Although a slice contains treeblocks that are consecutive in the raster scan within a tile, these treeblocks are not necessarily consecutive in the raster scan within the picture. Slices and tiles need not contain the same sequence of treeblocks. A tile may comprise treeblocks contained in more than one slice. Similarly, a slice may comprise treeblocks contained in several tiles.

In H.264/AVC and HEVC, in-picture prediction may be disabled across slice boundaries. Thus, slices can be regarded as a way to split a coded picture into independently decodable pieces, and slices are therefore often regarded as elementary units for transmission. In many cases, encoders may indicate in the bitstream which types of in-picture prediction are turned off across slice boundaries, and the decoder operation takes this information into account for example when concluding which prediction sources are available. For example, samples from a neighboring macroblock or CU may be regarded as unavailable for intra prediction, if the neighboring macroblock or CU resides in a different slice.

A syntax element may be defined as an element of data represented in the bitstream. A syntax structure may be defined as zero or more syntax elements present together in the bitstream in a specified order.

In a draft HEVC, there is also a third type of parameter sets, here referred to as an Adaptation Parameter Set (APS), which includes parameters that are likely to be unchanged in several coded slices but may change for example for each picture or each few pictures. In a draft HEVC, the APS syntax structure includes parameters or syntax elements related to quantization matrices (QM), adaptive sample offset (SAO), adaptive loop filtering (ALF), and deblocking filtering. In a draft HEVC, an APS is a NAL unit and coded without reference or prediction from any other NAL unit. An identifier, referred to as aps_id syntax element, is included in APS NAL unit, and included and used in the slice header to refer to a particular APS.

H.264/AVC and HEVC syntax allows many instances of parameter sets, and each instance is identified with a unique identifier. In order to limit the memory usage needed for parameter sets, the value range for parameter set identifiers has been limited. In H.264/AVC and a draft HEVC standard, each slice header includes the identifier of the picture parameter set that is active for the decoding of the picture that contains the slice, and each picture parameter set contains the identifier of the active sequence parameter set. In a HEVC standard, a slice header additionally contains an APS identifier. Consequently, the transmission of picture and sequence parameter sets does not have to be accurately synchronized with the transmission of slices. Instead, it is sufficient that the active sequence and picture parameter sets are received at any moment before they are referenced, which allows transmission of parameter sets "out-of-band" using a more reliable transmission mechanism compared to the protocols used for the slice data. For example, parameter sets can be included as a parameter in the session description for Real-time Transport Protocol (RTP) sessions. If parameter sets are transmitted in-band, they can be repeated to improve error robustness.

A SEI NAL unit may contain one or more SEI messages, which are not required for the decoding of output pictures but may assist in related processes, such as picture output timing, rendering, error detection, error concealment, and resource reservation. Several SEI messages are specified in H.264/AVC and HEVC, and the user data SEI messages enable organizations and companies to specify SEI messages for their own use. H.264/AVC and HEVC contain the syntax and semantics for the specified SEI messages but no process for handling the messages in the recipient is defined. Consequently, encoders are required to follow the H.264/AVC standard or the HEVC standard when they create SEI messages, and decoders conforming to the H.264/AVC standard or the HEVC standard, respectively, are not required to process SEI messages for output order conformance. One of the reasons to include the syntax and semantics of SEI messages in H.264/AVC and HEVC is to allow different system specifications to interpret the supplemental information identically and hence interoperate. It is intended that system specifications can require the use of particular SEI messages both in the encoding end and in the decoding end, and additionally the process for handling particular SEI messages in the recipient can be specified.

A coded picture is a coded representation of a picture. A coded picture in H.264/AVC comprises the VCL NAL units that are required for the decoding of the picture. In H.264/AVC, a coded picture can be a primary coded picture or a redundant coded picture. A primary coded picture is used in the decoding process of valid bitstreams, whereas a redundant coded picture is a redundant representation that should only be decoded when the primary coded picture cannot be successfully decoded. In a draft HEVC, no redundant coded picture has been specified.

In H.264/AVC, an access unit may also include an auxiliary coded picture, which is a picture that supplements the primary coded picture and may be used for example in the display process. An auxiliary coded picture may for example be used as an alpha channel or alpha plane specifying the transparency level of the samples in the decoded pictures. An alpha channel or plane may be used in a layered composition or rendering system, where the output picture is formed by overlaying pictures being at least partly transparent on top of each other. An auxiliary coded picture has the same syntactic and semantic restrictions as a monochrome redundant coded picture. In H.264/AVC, an auxiliary coded picture contains the same number of macroblocks as the primary coded picture.

A coded video sequence is defined to be a sequence of consecutive access units in decoding order from an IDR access unit, inclusive, to the next IDR access unit, exclusive, or to the end of the bitstream, whichever appears earlier.

A group of pictures (GOP) and its characteristics may be defined as follows. A GOP can be decoded regardless of whether any previous pictures were decoded. An open GOP is such a group of pictures in which pictures preceding the initial intra picture in output order might not be correctly decodable when the decoding starts from the initial intra picture of the open GOP. In other words, pictures of an open GOP may refer (in inter prediction) to pictures belonging to a previous GOP. An H.264/AVC decoder can recognize an intra picture starting an open GOP from the recovery point SEI message in an H.264/AVC bitstream. An HEVC decoder can recognize an intra picture starting an open GOP, because a specific NAL unit type, CRA NAL unit type, is used for its coded slices. A closed GOP is such a group of pictures in which all pictures can be correctly decoded when the decoding starts from the initial intra picture of the closed GOP. In other words, no picture in a closed GOP refers to any pictures in previous GOPs. In H.264/AVC and HEVC, a closed GOP starts from an IDR access unit. As a result, closed GOP structure has more error resilience potential in comparison to the open GOP structure, however at the cost of possible reduction in the compression efficiency. Open GOP coding structure is potentially more efficient in the compression, due to a larger flexibility in selection of reference pictures.

The bitstream syntax of H.264/AVC and HEVC indicates whether a particular picture is a reference picture for inter prediction of any other picture. Pictures of any coding type (I, P, B) can be reference pictures or non-reference pictures in H.264/AVC and HEVC. The NAL unit header indicates the type of the NAL unit and whether a coded slice contained in the NAL unit is a part of a reference picture or a non-reference picture.

Many hybrid video codecs, including H.264/AVC and HEVC, encode video information in two phases. In the first phase, pixel or sample values in a certain picture area or "block" are predicted. These pixel or sample values can be predicted, for example, by motion compensation mechanisms, which involve finding and indicating an area in one of the previously encoded video frames that corresponds closely to the block being coded. Additionally, pixel or sample values can be predicted by spatial mechanisms which involve finding and indicating a spatial region relationship.

Prediction approaches using image information from a previously coded image can also be called as inter prediction methods which may also be referred to as temporal prediction and motion compensation. Prediction approaches using image information within the same image can also be called as intra prediction methods.

The second phase is one of coding the error between the predicted block of pixels or samples and the original block of pixels or samples. This may be accomplished by transforming the difference in pixel or sample values using a specified transform. This transform may be a Discrete Cosine Transform (DCT) or a variant thereof. After transforming the difference, the transformed difference is quantized and entropy encoded.

By varying the fidelity of the quantization process, the encoder can control the balance between the accuracy of the pixel or sample representation (i.e. the visual quality of the picture) and the size of the resulting encoded video representation (i.e. the file size or transmission bit rate).

The decoder reconstructs the output video by applying a prediction mechanism similar to that used by the encoder in order to form a predicted representation of the pixel or sample blocks (using the motion or spatial information created by the encoder and stored in the compressed representation of the image) and prediction error decoding (the inverse operation of the prediction error coding to recover the quantized prediction error signal in the spatial domain).

After applying pixel or sample prediction and error decoding processes the decoder combines the prediction and the prediction error signals (the pixel or sample values) to form the output video frame.

The decoder (and encoder) may also apply additional filtering processes in order to improve the quality of the output video before passing it for display and/or storing as a prediction reference for the forthcoming pictures in the video sequence.

An Exemplary Video Encoder

When coding a block of pixels in a picture or video frame, a prediction block may be generated based on one or more previously coded reference blocks using either inter prediction or intra prediction. The prediction block may be an estimated version of the original block. A residual block may be generated by subtracting the original block from the prediction block, or vice versa, which may represent prediction residuals or errors. Since an amount of data needed to represent the prediction residuals may typically be less than an amount of data needed to represent the original block, the residual block may be encoded to achieve a higher compression ratio.

Then, residual values of the residual block in a spatial domain may be converted to transform coefficients in a frequency domain. The conversion may be realized through a two-dimensional transform, e.g. a transform that closely resemble discrete cosine transform (DCT). In a transform matrix, low-index transform coefficients (e.g., located in a top-left region) may correspond to big spatial features and have relatively high magnitudes, while high-index transform coefficients (e.g., located in a bottom-right region) may correspond to small spatial features and have relatively small magnitudes. Further, a quantization matrix (QM) comprising quantization coefficients may be applied to the transform matrix, thereby quantizing all transform coefficients to become quantized transform coefficients. As a result of quantization, the scale or magnitude of transform coefficients may be reduced. Some high-index transform coefficients may be reduced to zero, which may then be skipped in subsequent scanning and coding steps.

FIG. 1 illustrates part of an exemplary video encoder (10) comprising a transform unit or module (12), a quantization module (14), and an entropy encoder or encoding module (16). Although not shown in FIG. 1, it should be understood that other modules, such as prediction module, dequantization module, reconstruction module, etc., may also be present in the video encoder 10. In operation, the video encoder 10 may obtain or acquire a source picture or video frame, which may contain multiple video blocks. In the interest of clarity, the encoding of one source video block is considered here as an example. To encode the video block, a prediction block may first be generated as an estimation of the video block. Recall that the prediction block may be generated via inter or intra prediction by a prediction module. Then, a difference between the source video block and the prediction block may be computed to generate a residual block. The residual block may be transformed by the transform module 12 into transform coefficients. During transform, residual pixel values in a spatial domain, which comprises big features and small features, are converted to transform coefficients in a frequency domain, which comprises high frequency bands and low frequency bands. Afterwards, the quantization module may use a QM to quantize the transform coefficients, thereby generating quantized transform coefficients. Further, the quantized transform coefficients may be encoded by the entropy encoding module and eventually transmitted from the video encoder 10 as part of a bitstream.

A decoder may operate in a similar manner but at least partly in a reversed order.

The video encoder (10) and/or the decoder may be a graphics processing unit (GPU) provided by vendors like Nvidia and AMD. Nvidia's primary GPU product line labeled "GeForce" is in direct competition with AMD's "Radeon" products. Each of the various modules in the video encoder (10), e.g. the transform unit or module (12), the quantization module (14), and the entropy encoder or encoding module (16) may be separately implemented in a chip module in a GPU.

Intra Prediction Mode Coding

Intra prediction mode coding in HEVC is described in detail in an IEEE paper titled "Intra Coding of the HEVC Standard" which is accessible from IEEE website with the Digital Object Identifier "10.1109/TCSVT.2012.2221525". This IEEE paper is incorporated herein by reference as if reproduced in its entirety.

The coding structure utilized for intra coding in HEVC follows closely the overall architecture of the codec. Images are split into segments called coding units (CU), prediction units (PU), and transform units (TU). CU represent quadtree split regions that are used to separate the intra and inter coded blocks. Inside a CU, multiple nonoverlapping PUs can be defined, each of which specifies a region with individual prediction parameters. The CU is further split into a quadtree of transform units, each TU having a possibility of applying residual coding with a transform of the size of the TU.

A draft HEVC introduces 33 angular prediction modes (Modes 2 to 34) in addition to planar (Mode 0) and DC (Mode 1) modes for intra coding. Due to increased number of modes (35), efficient coding of intra prediction mode is achieved by using a list based approach. For each prediction unit, the most probable 3 modes are determined and a Most Probable Mode (MPM) list is constructed from these modes. The most probable modes are selected among the intra prediction modes of the neighbouring PUs, more specifically the left and the above neighbours. In order to avoid duplicates in the list, left and above neighbour's intra prediction modes are compared. If the two modes are the same and equal to either planar or DC modes, then the list is constructed as planar, DC and Angular (Mode 26—Vertical) in order. If the two modes are the same and equal to an angular mode, then the list is constructed by this mode and two angular modes that are closest to it. If the intra prediction modes of the left and above neighbours are different from each other, they are inserted in the list and the third mode is set as planar, DC or Angular (Mode 26—Vertical) in the mentioned order.

After determining the prediction mode of the current PU, the encoder checks whether this prediction mode is available in the MPM list. If so, only the index in the list is signaled. Otherwise, the current prediction mode is signaled after a fixed length binarization and bypass coding. There are 32 modes outside the MPM list which can be represented by 5 bits properly. Coding of luma intra prediction mode consists of three syntax elements, namely prev.intra. luma. pred.flag, mpm.idx and rem.intra.luma.pred.mode. The syntax element prev. intra.luma.pred.flag indicates whether the current prediction mode is in the MPM list or not. When this flag is equal to 0, the syntax element rem.intra.luma.pred.mode is coded indicating the prediction mode. When the flag is equal to 1, then the syntax element mpm.idx is coded from which the decoder can get the current intra prediction mode by constructing the MPM list.

While an increase in the number of intra prediction modes can provide substantial performance gains, it also makes the rate-distortion (RD) optimization process more complex. An encoding algorithm utilized by an official HEVC Test Model (HM) 6.0 reference software is described here.

The encoding algorithm of HM software includes two phases. In the first phase, the N most promising candidate modes are selected by the rough mode decision process. In this process, all candidates (35 modes) are evaluated with respect to the following cost function:

$$C = D_{Had} + \lambda \cdot R_{mode}$$

where the $D_{Had}$ represents the absolute sum of Hadamard transformed residual signal for a PU and represents the number of bits for the prediction mode.

In the second stage, the full RD costs with reconstructed residual signal used for actual encoding process are compared among the N best candidates. The prediction mode with the minimum RD cost is selected as the final prediction mode. The number N is varied depending on the PU size. The N is set to {8, 8, 3, 3, 3} for 4×4, 8×8, 16×16, 32×32, and 64×64 PU, respectively, to allow more thorough search for the small block sizes most critical to the joint optimization of prediction and residual data. It is noted that the size of TU may be assumed to be equal to the maximum possible value rather than allowing the TU splitting in this stage for minimizing the complexity. RD optimized TU structure is determined after the second stage by using the best prediction mode.

HEVC-Based Three-Dimensional (3D) Video Coding

The following MPEG documents are incorporated herein by reference as if reproduced in their entireties:

MPEG number m27310: G. Tech, K. Wegner, Y. Chen, S. Yea, "3D-HEVC Test Model 2" in JCT3V-B1005, Shanghai, China, 13-19, Oct. 2012. This document is accessible via the following URL: http://phenix.it-sud-paris.eu/jct3v/doc_end_user/current_document.php?id=460.

MPEG number m26012: J. Heo, E. Son, S. Yea, "3D-CE6.h: Region boundary chain coding for depth-map", in JCT3V-A0070, Stockholm, Sweden, 16-20, Jul. 2012. This document is accessible via the following URL: http://phenix.int-evry.fr/jct2/doc_end_user/current_document.php?id=62.

Several 3D video coding standards are currently developed by the Joint Collaborative Team on 3D Video Extension Development (JCT-3V), a joint working group of ISO/IEC MPEG and ITU-T VCEG. To support advanced applications and displays with wider range and continuous view adaptation, efficient compression of video texture and depth data is targeted.

3D video is intended to support 3D video applications, where 3D depth perception of a visual scene is provided by a 3D display system. There are many types of 3D display systems including classic stereo systems which require special-purpose glasses, to more sophisticated multiview auto-stereoscopic displays that do not require glasses, up to holographic displays which provide a large continuum of views from various directions. In more advanced displays, it is desirable or even required to adjust depth perception by automatic means or through an interaction with the end user. As a consequence, the data throughput relative to reference stereo displays becomes much larger, since the 3D impression is achieved by essentially emitting multiple complete video sample arrays in order to form view-dependent pictures. This puts additional challenges to representation formats and compression, which should deliver high quality data with as small amount of bits as possible. One key method to achieve this is the usage of depth or disparity data along with the video texture, which can then be used to generate additional views by synthesis methods known as image based rendering. In advanced methods, depth maps and their coherency with the video texture can further be exploited for a more compact representation of the overall 3D video.

JCT-3V is performing development study of two 3D video solutions that are using the HEVC coding technology. The first is a multi-view extension of HEVC, so called MV-HEVC and another is a depth enhanced HEVC-based full 3D video codec, 3D-HEVC.

With the advancement of ultra-high definition (UHD) display technology and the capability to present stereoscopic views with higher resolution, the demand for higher compression capability is again expected to arise together with advanced display features supported by depth maps. Therefore, joint compression of video texture and depth maps is becoming even more attractive, which is currently explored in JCT-3V by an extended codec concept nicknamed as 3D-HEVC.

The 3D-HEVC design exploits inter-component dependencies between texture and depth and introduces joint coding of texture and depth data. However, the concept is slightly different in that the depth map of a dependent view is not allowed to be utilized when coding the texture of the dependent view, i.e. the coding order is texture first for all views. Alternatively, the depth map of the base view can be used to perform view synthesis prediction in the dependent view, which requires some additional tricks since the corresponding areas of the two views are not co-located.

In addition, the 3D-HEVC development investigates development of more sophisticated and possibly simplified (lower complexity) depth map coding in the sub-Coded Tree Blocks (CTB) level of the core codec. This is motivated by the fact that the structure of depth maps significantly deviates from video texture, in that they usually show much more constancy (flat areas or gradual changes) and significant discontinuities at object edges. Therefore, specific coding tools (entitled as depth modeling modes—DMM) are defined, which allow to characterize the depth within a block by an edge (whose position could also be derived from the texture) and the depth values on both sides. Furthermore, not the whole depth range may be present in a given depth picture, which can be exploited by coding the depth via a depth lookup table (DLT).

Depth-Based Intra Prediction Mode Determination

The encoder and/or the decoder may determine an intra-prediction mode by using the depth information. The depth of the current texture block being coded or decoded may be compared to the depth of the neighboring texture blocks or boundary samples of the depth blocks co-located or corresponding to the neighboring texture blocks, and the intra prediction mode of the current texture block may be determined on the basis of this comparison. For example, if the depth of the current texture block is very similar to the depth of the boundary samples, a DC prediction may be inferred. In another example, a depth boundary is detected in the current depth block and a bi-directional intra prediction for the current texture block is inferred.

As the intra prediction mode may be inferred in the encoder and the decoder, no syntax element may be coded and bitrate may be reduced. The use of depth-based intra prediction mode determination may be signaled for example in the slice header and the encoder may turn a depth-based intra prediction mode on using rate-distortion optimized decision comparing a depth-based prediction mode determination and a reference intra prediction mode determination and syntax element coding.

The intra prediction mode of the depth block may be used for intra prediction of the respective or co-located texture block (in both the encoder and decoder).

Similarly to block partitioning, there are multiple options for entropy coding of the intra prediction mode, including the following. The bi-directional intra prediction mode may be inferred when there is a depth boundary within the block, and otherwise reference intra prediction may be used for the block, where encoder determines the intra prediction mode and indicates it in the bitstream. As the intra prediction mode is inferred in both the encoder and decoder, no syntax element is coded.

In another option, the intra prediction mode may be coded into the bitstream but the depth-based prediction of the intra prediction mode may be applied in both encoder and decoder to modify the context state of CABAC or context-based variable length coding or any similar entropy coding in such a manner that the intra prediction mode chosen by the depth-based algorithm may use a smaller amount of coded data bits. In effect, the likelihood of the intra prediction mode deduced by the depth-based algorithm may be increased in the entropy coding and decoding.

In yet another option the intra prediction mode may be coded into the bitstream but the code table or binarization table used in the intra prediction mode codeword may be dependent on the result of the depth-based algorithm.

The use of depth-based intra prediction mode determination may be signaled for example in the slice header, macroblock syntax, or block syntax and the encoder may turn it on using rate-distortion optimized decision comparing depth-based prediction mode determination and reference intra prediction mode determination.

The encoder may, for example, perform reference intra prediction mode selection e.g. using rate-distortion optimization. If the rate-distortion cost of reference intra prediction is smaller than that of the depth-based intra prediction mode selection, the encoder may choose to use reference intra prediction and indicate the use of the reference intra prediction in the bitstream, for example in the slice header, macroblock syntax, or block syntax.

The decoder may decode the syntax element(s) related to the intra prediction mode and decode the bitstream using the indicated intra prediction mode and related syntax elements.

Many video encoders utilize the Lagrangian cost function to find rate-distortion optimal coding modes, for example the desired macroblock mode and associated motion vectors. This type of cost function uses a weighting factor or $\lambda$ to tie together the exact or estimated image distortion due to lossy coding methods and the exact or estimated amount of information required to represent the pixel/sample values in an image area. The Lagrangian cost function may be represented by the equation: $C=D\lambda R$, where C is the Lagrangian cost to be minimized, D is the image distortion (for example, the mean-squared error between the pixel/sample values in original image block and in coded image block) with the mode and motion vectors currently considered, $\lambda$ is a Lagrangian coefficient and R is the number of bits needed to represent the required data to reconstruct the image block in the decoder (including the amount of data to represent the candidate motion vectors).

Block Partition Modes (BPMs)

Depth maps are mainly characterized by sharp edges (which represent object borders) and large areas of nearly constant or slowly varying sample values (which represent object areas). While the HEVC intra prediction and transform coding is well-suited for nearly constant regions, it can result in significant coding artifacts at sharp edges, which are visible in synthesized intermediate views. For a better representation of edges in depth maps, four new intra prediction modes for depth coding are added. In all four modes, a depth block is approximated by a model that partitions the area of the block into two non-rectangular regions, where each region is represented by a constant value. The information required for such a model consists of two elements, namely the partition information, specifying the region each sample belongs to, and the region value information, specifying a constant value for the samples of the corresponding region. Such a region value is referred to as constant partition value (CPV) in the following. Two different partition types are used, namely Wedgelets and Contours, which differ in the way the segmentation of the depth block is derived. The depth modelling modes are integrated as an alternative to the reference intra prediction modes specified in HEVC. Similar as for the intra prediction modes, a residual representing the difference between the approximation and the original depth signal can be transmitted via transform coding. In the following, the approximation of depth blocks using the four new depth modelling modes is described in more detail.

Figure 2:
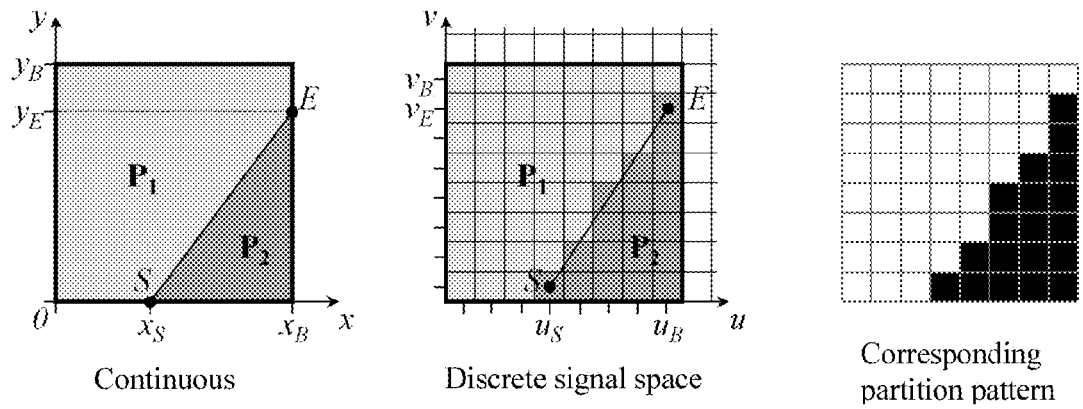
FIG. 2 illustrates embodiments of Wedgelet partition of a block: continuous (left) and discrete signal space (middle) with corresponding partition pattern (right).

FIG. 2 illustrates embodiments of Wedgelet partition of a block: continuous (left) and discrete signal space (middle) with corresponding partition pattern (right). It is differentiated between Wedgelet and Contour partitioning. For a Wedgelet partition, the two regions are defined to be separated by a straight line, as illustrated in FIG. 2, in which the two regions are labelled with $P_1$ and $P_2$. The separation line is determined by the start point 5 and the end point P, both located on different borders of the block. For the continuous signal space (see FIG. 2, left), the separation line can be described by the equation of a straight line. The middle image of FIG. 2 illustrates the partitioning for the discrete sample space. Here, the block consists of an array of samples with size v and the start and end points correspond to border samples. Although the separation line can be described by a line equation as well, the definition of regions $P_1$ and $P_2$ is different here, as only complete samples can be assigned as part of either of the two regions. For employing Wedgelet block partitions in the coding process, the partition information is stored in the form of partition patterns. Such a pattern consists of an array of size $u_B \times v_B$ and each element contains the binary information whether the corresponding sample belongs to region $P_1$ or $P_2$. The regions $P_1$ and $P_2$ are represented by black and white samples in FIG. 2 (right), respectively.

Figure 3:
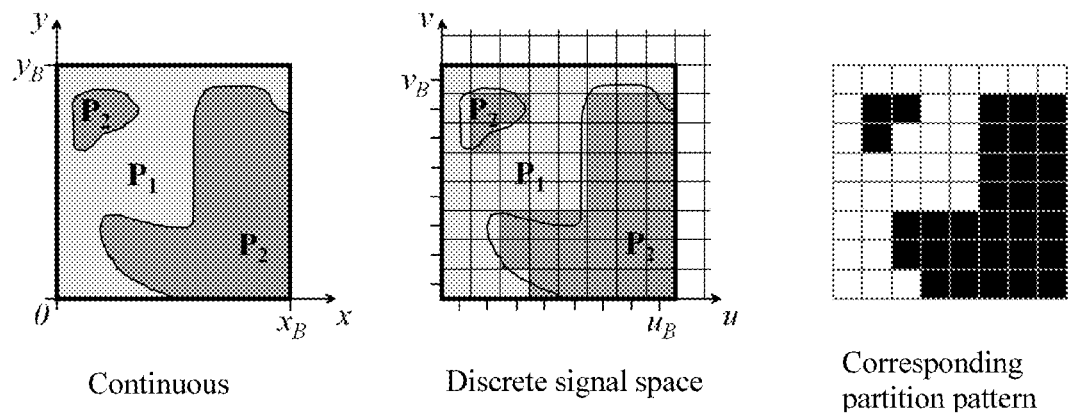
FIG. 3 illustrates embodiments of Contour partition of a block: continuous (left) and discrete signal space (middle) with corresponding partition pattern (right).

FIG. 3 illustrates embodiments of Contour partition of a block: continuous (left) and discrete signal space (middle) with corresponding partition pattern (right). Unlike for Wedgelets, the separation line between the two regions of a Contour partition of a block cannot be easily described by a geometrical function. As illustrated in FIG. 3, the two regions $P_1$ and $P_2$ can be arbitrary shaped and even consist of multiple parts. Apart from that the properties of Contour and Wedgelet partitions are very similar. For employing Contour partitions in the coding process, the partition pattern (see example in FIG. 3, right) is derived individually for each block from the signal of a reference block. Due to the lack of a functional description of the region separation line, no pattern lookup lists and consequently no search of the best matching partition are used for Contour partitions.

Apart from the partition information, either in form of a Wedgelet or a Contour partition, the second information required for modelling the signal of a depth block is the CPV of each of the two regions. For a given partition the best approximation is consequently achieved by using the mean value of the original depth signal of the corresponding region as the CPV.

Four depth-modelling modes (DMMs), which mainly differ in the way the partitioning is derived and transmitted, have been added:

Mode 1: Explicit Wedgelet signalling;
Mode 2: Intra-predicted Wedgelet partitioning;
Mode 3: Inter-component-predicted Wedgelet partitioning;
Mode 4: Inter-component-predicted Contour partitioning.

These depth-modelling modes as well as the signalling of the modes and the constant partition values are described in the following.

The basic principle of Mode 1, i.e. Explicit Wedgelet signaling, is to find the best matching Wedgelet partition at the encoder and transmit the partition information in the bitstream. At the decoder the signal of the block is reconstructed using the transmitted partition information. The Wedgelet partition information for this mode is not predicted. At the encoder, a search over a set of Wedgelet partitions is carried out using the original depth signal of the current block as a reference. During this search, the Wedgelet partition that yields the minimum distortion between the original signal and the Wedgelet approximation is selected. The resulting prediction signal is then evaluated using the reference mode decision process. A fast search of the best matching partition is essential for employing Wedgelet models in the depth coding process.

The basic principle of Mode 2, i.e. Intra-predicted Wedgelet partitioning, is to predict the Wedgelet partition from data of previously coded blocks in the same picture, i.e. by intra-picture prediction. For a better approximation, the predicted partition is refined by varying the line end position. Only the offset to the line end position is transmitted in the bitstream and at the decoder the signal of the block is reconstructed using the partition information that results from combining the predicted partition and the transmitted offset.

The basic principle of Mode 3, i.e. Inter-component-predicted Wedgelet partitioning, is to predict the Wedgelet partition from a texture reference block, namely the co-located block of the associated video picture. This type of prediction is referred to as inter-component prediction. Unlike temporal or inter-view prediction, no motion or disparity compensation is used, as the texture reference picture shows the scene at the same time and from the same perspective. The Wedgelet partition information is not transmitted for this mode and consequently, the inter-component prediction uses the reconstructed video picture as a reference. For efficient processing, only the luminance signal of the reference block is taken into account, as this typically contains the most significant information for predicting the partition of a depth block, i.e. the edges between objects.

The basic principle of Mode 4, i.e. Inter-component-predicted Contour partitioning, is to predict a Contour partition from a texture reference block by inter-component prediction. Like for the inter-component prediction of a Wedgelet partition pattern, the reconstructed luminance signal of the co-located block of the associated video picture is used as a reference. In contrast to Wedgelet partitions, the prediction of a Contour partition is realized by a thresholding method. Here, the mean value of the texture reference block is set as the threshold and depending on whether the value of a sample is above or below the sample position is marked as part of region $P_1$ or $P_2$ in the resulting Contour partition pattern.

In an encoding process, for an intra-coded CU, one of the described depth modelling modes or one of the reference intra prediction modes is selected. If a depth modelling mode is selected, the selected mode and the associated prediction data have to be signalled in a bitstream in addition to a syntax element that specifies the usage of a depth modelling mode. The following four depth modelling modes are defined:

Wedgelet_ModelIntra: Intra modelling of Wedgelet block partition

Wedgelet_PredIntra: Intra prediction of Wedgelet block partition

Wedgelet_PredTexture: Inter-component prediction of Wedgelet block partition

Contour_PredTexture: Inter-component prediction of Contour block partition

Each of the four modes can be applied with or without delta CPVs, resulting in eight different mode_IDs for signalling the decoder, which type of processing has to be applied for prediction and reconstruction of the block.

The region boundary chain coding mode partitions the block into two regions by signalling the region boundaries with chain codes. The region boundary chain coding consists of four steps.

Step 1: Find Internal Edges

The internal edges inside a depth-map block are calculated in the encoder. The step consists of several procedures.

i) Calculate differences between vertically and horizontally adjacent pixels.

ii) Mark as edge candidates if the difference is greater than the threshold.

iii) Eliminate the edge candidates which have smaller differences than neighbouring edge candidates.

iv) Connect unlinked edges if necessary.

v) Prune unconnected edges.

vi) Check whether the block consists of two regions exactly. Otherwise, the method will not be applied further.

Step 2: Code the Edges Using Chain Codes

The edges are encoded by using chain codes. First, an edge starts from the block boundaries. Then, the next edge is chosen as an edge connected to the current one. The final edge ends at the boundaries. To construct chain codes, it defines seven traverse types (0, 45, −45, 90, −90, 135, and −135 degree) and their edge patterns.

Step 3: Convert the Chain Codes into Bitstream Syntax

The region boundaries are expressed as a set of an edge starting point and the traverse codes.

Step 4: Calculate the Predictors and Fill them into the Block

After the regional average values are chosen as the predictors for partitioned regions, the method for constant partition value (CPV) coding can be applied to the mean value of the signal covered by the corresponding region.

Complexity Simplification

In a HEVC-based three-dimensional (3D) video coding mechanism, block partition modes (BPMs), e.g. depth modeling modes (DMMs) and/or region boundary chain modes (RBCMs), are utilized together with intra coding schemes of HEVC for intra coding of a depth map. During a mode selection process, a full-rate distortion (full-RD) search list may be created and several most probable modes (MPMs) e.g. 8 for 4×4 and 8×8 CU sizes, 3 for 16×16, 32×32, 64×64 CU sizes, may be selected from 36 intra prediction modes for a full-RD cost calculation. After selection of several MPMs, e.g. 3 or 8 MPMs, all BPMs, e.g. DMMs and/or RBCMs, available may also be added to the full-RD search list for a full-RD cost calculation.

It is noted that each MPM, as a candidate, may be associated with a probability to be selected as a final prediction mode for coding a depth block. A priority of the full-RD search list thus is related with such probability. For example, an MPM's relative position in the full-RD search list may be corresponding to its probability of being selected as a final prediction mode for coding a depth block. As a further example, the first or second MPM in the full-RD search list may be the candidate MPM(s) with highest probability of being selected as a final prediction mode for coding a depth block.

It is observed that after a full-RD cost calculation, a block partition mode (BPM), e.g. a DMM or an RBCM, has comparatively lower probability of being selected as a final prediction mode. This observation puts adding a BPM, e.g.

a DMM or an RBCM, into a full-RD search list in the first place into a question. The reason that a BPM, e.g. a DMM or an RBCM, has comparatively lower probability of being selected as a final prediction mode is largely due to the observation that most CUs in a depth map are flat or smooth, in which case a suitable flat coding mode, e.g. a candidate MPM, may be placed in a priority position of the full-RD search list, e.g. the first/second position of the full-RD search list. However BPM, e.g. DMM and/or RBCM, is designated mainly for CU with edge or sharp transition, which hints that BPM, e.g. DMM and/or RBCM, is less efficient for smooth CU compression. Therefore, in a case of smooth CU compression, avoiding adding BPM, e.g. DMM and/or RBCM, into a full-RD search list in the first place may be advantageous in terms of complexity simplification.

It is also observed that a variance of a block, e.g. a CU, which selects a BPM, e.g. DMM and/or RBCM, as a best mode is often higher than that of a CU which selects a reference IPM as a best mode. A variance of a CU means a variance of pixel values in the CU. The higher the variance of a block, the more likely that the block is with edge or sharp transition, which means a BPM is more likely to be selected. The lower the variance of a block, the more likely that the block is smooth, the less likely a BPM is to be selected. Therefore, taking a variance of a block into consideration, for some smooth CU compression scenarios, avoiding adding BPM, e.g. DMM and/or RBCM, into a full-RD search list in the first place may also be advantageous in terms of complexity simplification.

In an exemplary HEVC-based depth intra coding mechanism, all available block partition modes (BPMs), e.g. Depth Modelling Modes (DMMs) and/or region boundary chain modes (RBCMs), may be added into a full-rate distortion (RD) search list for full-RD cost calculation. Thus for a CU to be coded, a RD search list may be created to include several candidate MPMs and BPMs (DMMs and/or RBCMs), each of which may be associated with a RD cost calculation. The prediction mode with the minimum RD cost may be selected as the final prediction mode for coding the CU. It is observed that the mode decision process in this depth intra coding mechanism may be simplified. As disclosed in various embodiments, in many cases, BPM e.g. DMM and/or RBCM, full-RD search may be skipped (e.g. RD cost calculation for BPM may be skipped) since most coding units (CUs) of a depth map are very flat or smooth, and BPMs e.g. DMMs and/or RBCMs, are designed for CUs with edge or sharp transition. Various embodiments are disclosed herein whose rationale may be applied to speed up mode decision process in a depth intra coding scenario. It is observed that 26%-34% encoding time may be saved for All-Intra test cases and almost no Bjøntegaard-Delta (BD) Rate difference is observed if such rationale is applied.

It is noted that in this disclosure, a full-RD search list and a full-RD cost calculation list may be termed as the same concept.

In accordance with an embodiment, a variance of a block is considered before adding a BPM into a full-RD. For example, if the variance of a current block, e.g. a CU, is higher than a threshold, all BPMs are added into a full-RD cost calculation list. The threshold may be predefined, or calculated in real time. An embodiment of calculating the threshold (varThreshold in Eqn. (2)) is provided below:

$$\text{threshold} = \max((CU\_depth\_QP*205) >> 10) - 4, 1) \quad (1)$$

$$var\text{Threshold} = \text{threshold}*\text{threshold} - 3*(\text{threshold} - 1), \quad (2)$$

where CU_depth_QP stands for a quantization parameter (QP) used in depth map coding, >> stands for shift operation. As an empirical embodiment, when CU_depth_QP is 34, 39, 42, and 45, the corresponding variance threshold (varThreshold) are 1, 3, 7, and 13.

Of course, in a general sense, an embodiment of calculation the threshold may be generalized as:

$$\text{threshold} = \max((CU\_depth\_QP*a) >> b) - c, d) \quad (3),$$

where a, b, c, d are real numbers. And equation (3) conveys well the initiative that instead of performing division operation, which is with high complexity, any of the following operation is optionally performed: shift, multiply, add, and minus.

In accordance with an embodiment, an additional condition is checked before adding any BPM, e.g. DMM and/or RBCM, into a full-RD cost calculation list. The additional condition may be based on a priority mode of the full-RD cost calculation list, or a variance of the current block. For example, in a case that a priority mode (e.g. a first/second mode) in the full-RD cost calculation list is a flat coding mode (e.g. a DC mode, a planar mode), which may hint the block is smooth, BPM is not added; otherwise, BPM may be added. For example, in another case that a variance of the current block (e.g. a CU) is smaller than a threshold, which may hint the block is smooth, BPM is not added; otherwise, BPM may be added.

Figure 4:
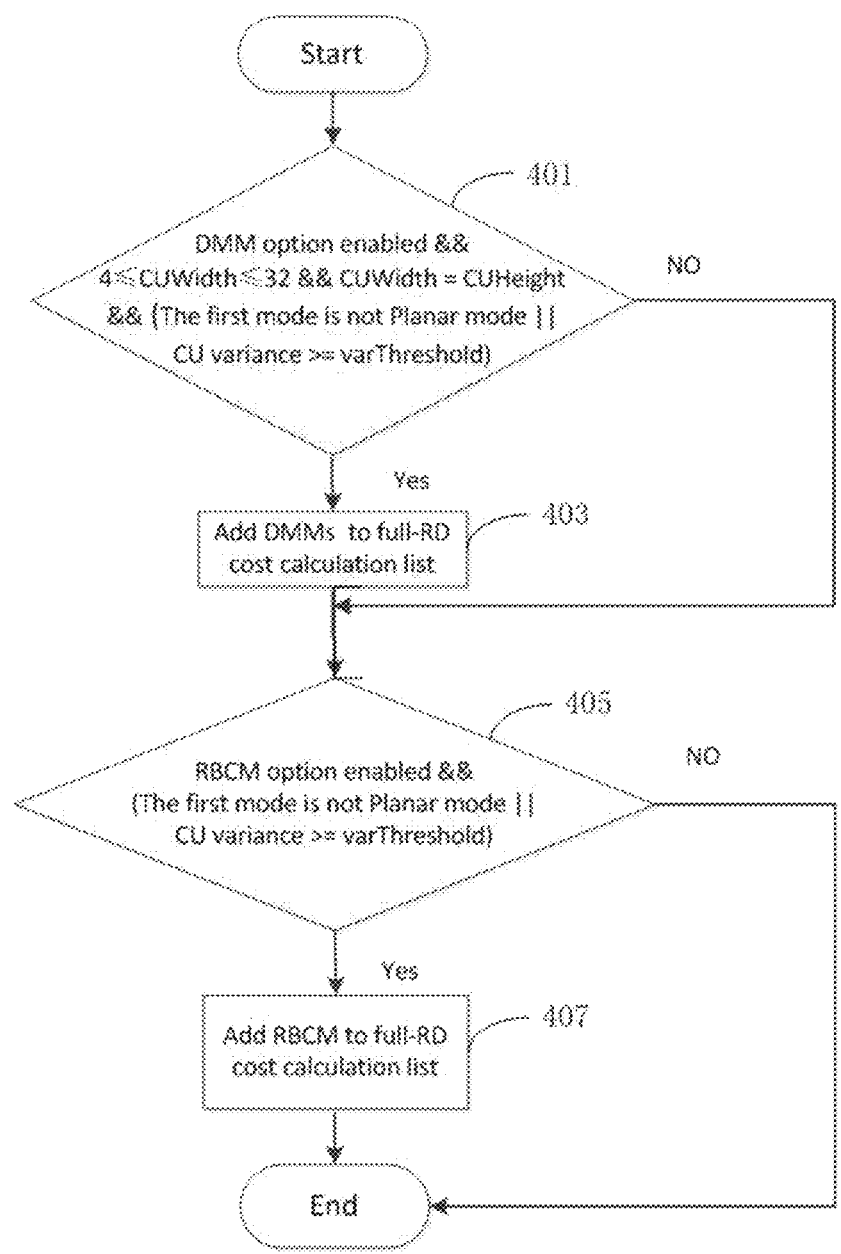
FIG. 4 illustrates an embodiment of a depth map coding mode selection algorithm.

FIG. 4 illustrates an embodiment of a depth map coding mode selection algorithm.

Step 401: a decision condition is proposed.

For example: whether a DMM option is enabled/disabled, whether a width of the current CU is within the range of [4, 32], whether a width of the current CU is equal to the height of the current CU, whether the first mode in a full-RD cost calculation list is a planar mode, and whether a variance of the current CU is greater than (i.e. ">=") a threshold.

Step 403: in a case that the DMM option is enabled, the width of the current CU is within the range of [4, 32], the width of the current CU is equal to the height of the current CU, and the first mode in the full-RD cost calculation list is not a planar mode or the variance of the current CU is greater than the threshold, BPM (e.g. one or more DMMs) is added into the full-RD cost calculation list; otherwise, BPM is not added into the full-RD cost calculation list.

Step 405: another decision condition is proposed.

For example: whether an RBCM option is enabled/disabled, whether a first mode in the full-RD cost calculation list is a planar mode, and whether a variance of the current CU is greater than (i.e. ">=") a threshold. It is noted that the decision condition in step 405 may be simplified due to the appreciation that duplicated decision condition listed in step 401 may not be necessary to be performed more than once. For example, decision condition in step 405 may be simplified to include only whether an RBCM option is enabled/disabled, and at the same time benefit from what may be concluded from step 401, e.g. whether a first mode in the full-RD cost calculation list is a planar mode, and whether a variance of the current CU is greater than (i.e. ">=") a threshold.

Step 407: in a case that the RBCM option is enabled, and the first mode in the full-RD cost calculation list is not a planar mode or the variance of the current CU is greater than the threshold, BPM (e.g. one or more RBCMs) is added into the full-RD cost calculation list; otherwise, BPM is not added into the full-RD cost calculation list.

It is understood by a person ordinarily skilled in the art that the algorithm illustrated by FIG. 4 may be implemented in a video encoder. The video encoder may include necessary computing resource, e.g. a processor, and necessary storage resource, e.g. a memory. The video encoder may also include necessary function modules to implement the algorithm. The video encoder may be a graphics processing unit (GPU) provided by vendors like Nvidia and AMD. Each of the various function modules in the video encoder may be separately implemented in a chip module in a GPU.

Figure 5A:
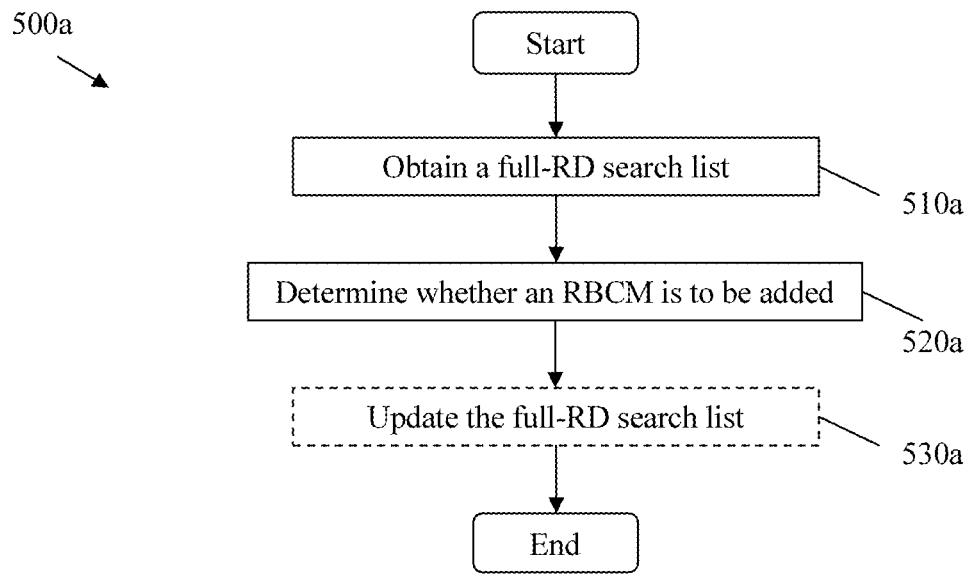
FIG. 5a illustrates an embodiment of a mode selection method.

FIG. 5a illustrates an embodiment of a mode selection method 500a, which may be implemented on an encoding side comprising a video encoder (e.g. the video encoder 10). This method may be applied for depth intra coding.

Step 510a, a full-RD search list is obtained.

The full-RD search list may include an order list of candidate coding modes, e.g. MPMs and/or other intra prediction modes (IPMs). The full-RD search list may be regarded as a depth intra coding mode list. The full-RD search list may be obtained before any RBCM is added into the full-RD search list. Candidate modes in the full-RD search list may be also obtained. These candidate modes may be applied to a full-RD calculation for determining a best mode for coding a current block.

Step 520a, a determination is made as to whether an RBCM is to be added into the full-RD search list.

An implementation example of such determination may be whether an RBCM is selected in the current full-RD search list. It is noted that the determination may be based on a decision condition. The decision condition may be whether the full-RD search list includes a flat coding mode. A flat coding mode may be an intra coding mode suitable for flat region in a depth map, e.g. a planar mode, or a DC mode. In a case that the full-RD search list includes a flat coding mode, an RBCM may not be selected as a candidate mode, e.g. adding an RBCM into the full-RD search list; otherwise, in a case that the full-RD search list does not include a flat coding mode, an RBCM may be selected as a candidate mode. The decision condition may also be whether the first (and/or the second) mode in the full-RD search list is a flat coding mode. In a case that the first (and/or the second) mode in the full-RD search list is a flat coding mode, an RBCM may not be selected as a candidate mode, e.g. adding an RBCM into the full-RD search list; otherwise, in a case that the first (and/or the second) mode in the full-RD search list is not a flat coding mode, an RBCM may be selected as a candidate mode.

Optionally, in Step 530a, the full-RD search list may be updated in accordance with the determination result in accordance with step 520a.

In a case that at least one RBCM is to be added, the at least one RBCM may be added into the full-RD search list, i.e. the full-RD search list may be updated. It may be unnecessary to update the full-RD search list in the case that no RBCM is to be added. It is noted that, the number of added RBCMs may be less than the total number of all available RBCMs. It is also noted that the full-RD search list, with or without any RBCM added, may be utilized in a full-RD cost calculation for depth intra coding. It is noted that the full-RD search list, with or without any RBCM added, may be utilized in a full-RD cost calculation for depth intra coding.

It is understood by a person ordinarily skilled in the art that the algorithm illustrated by FIG. 5a may be implemented in a video encoder. The video encoder may include necessary computing resource, e.g. a processor, and necessary storage resource, e.g. a memory. The video encoder may also include necessary function modules to implement the algorithm. The video encoder may be a graphics processing unit (GPU) provided by vendors like Nvidia and AMD. Each of the various function modules in the video encoder may be separately implemented in a chip module in a GPU.

Figure 5B:
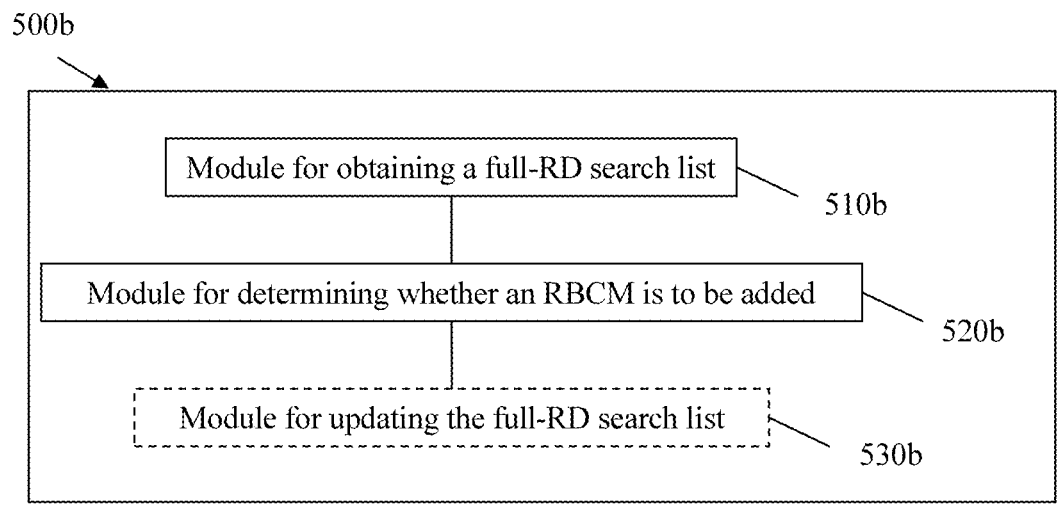

FIG. 5b illustrates an embodiment of an apparatus 500b, which may be a video encoder (e.g. the video encoder 10). This apparatus, which includes various function modules, e.g. blocks 510b, 520b (and optionally 530b), is capable of implementing the algorithm illustrated by FIG. 5a. Detailed discussion of functions of these modules may be directed to relevant parts more fully described for FIG. 5a.

Figure 6A:
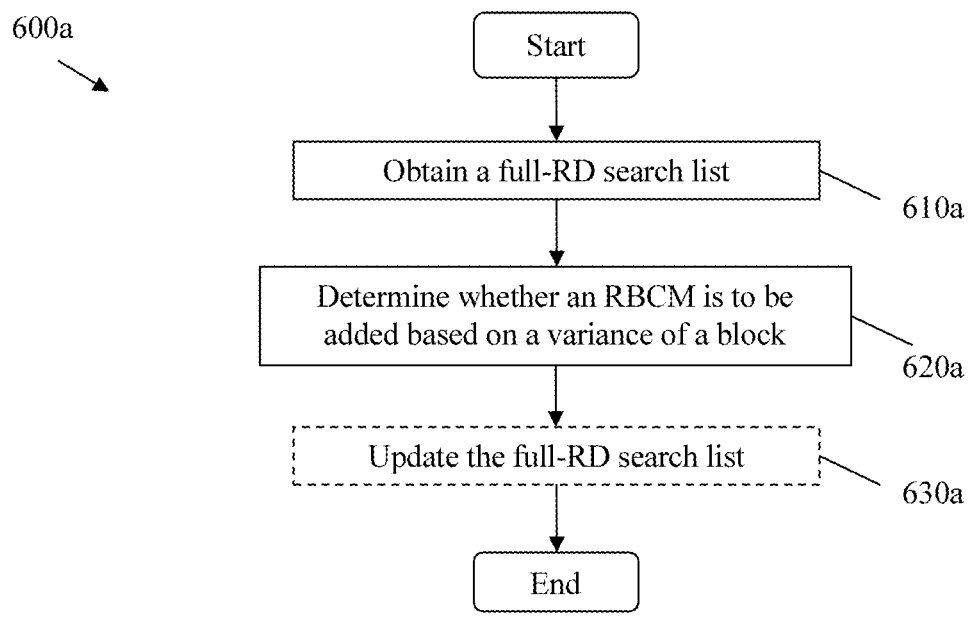
FIG. 6a illustrates another embodiment of a mode selection method.

FIG. 6a illustrates another embodiment of a mode selection method 600a, which may be implemented on an encoding side comprising a video encoder (e.g. the video encoder 10). This method may be applied for depth intra coding.

Step 610a, a full-RD search list is obtained. A more detailed description of step 610a may be referred to the detailed description of step 510a more fully described above.

Step 620a, a determination is made as to whether an RBCM is to be added into the full-RD search list (e.g. an RBCM is selected as a candidate mode) based on a variance of a current block.

A variance of a block (e.g. a CU) means a variance of pixel values in the block. It is noted that the determination may be based on a decision condition. The decision condition may be: whether the variance is greater than a threshold, whether the variance is 0, whether the variance is 1. In a case that the variance is greater than a threshold, an RBCM may be added into the full-RD search list; otherwise, no RBCM is added. In a case that the variance is not 0, an RBCM may be added into the full-RD search list; otherwise, no RBCM is added. In a case that the variance is not 1, an RBCM may be added into the full-RD search list; otherwise, no RBCM is added.

The optional threshold mentioned above may be specified as a function of a quantization parameter (QP). The value of the threshold may have a smallest value, e.g. a smallest value is set to be greater than 0 or 1. The function of a QP is:

$$\text{threshold} = \max((CU\_depth\_QP * a) >> b) - c, d;$$

where CU_depth_QP stands for a QP used in depth map coding, >> stands for shift operation. And some empirical applications of the function are listed below without losing generality:

$$\text{threshold} = \max((CU\_depth\_QP * 205) >> 10) - 4, 1);$$

$$\text{threshold} = \max((CU\_depth\_QP * 205) >> 10) - 4, 2); \text{ and}$$

$$\text{threshold} = \max((CU\_depth\_QP * 103) >> 9) - 4, 1).$$

Optionally, in Step 630a, the full-RD search list may be updated in accordance with the determination result. A more detailed description of step 630a may be referred to the detailed description of step 530a more fully described above.

It is understood by a person ordinarily skilled in the art that the algorithm illustrated by FIG. 6a may be implemented by a video encoder. The video encoder may include necessary computing resource, e.g. a processor, and necessary storage resource, e.g. a memory. The video encoder may also include necessary function modules to implement the algorithm. The video encoder may be a graphics processing unit (GPU) provided by vendors like Nvidia and AMD. Each of the various function modules in the video encoder may be separately implemented in a chip module in a GPU.

Figure 6B:
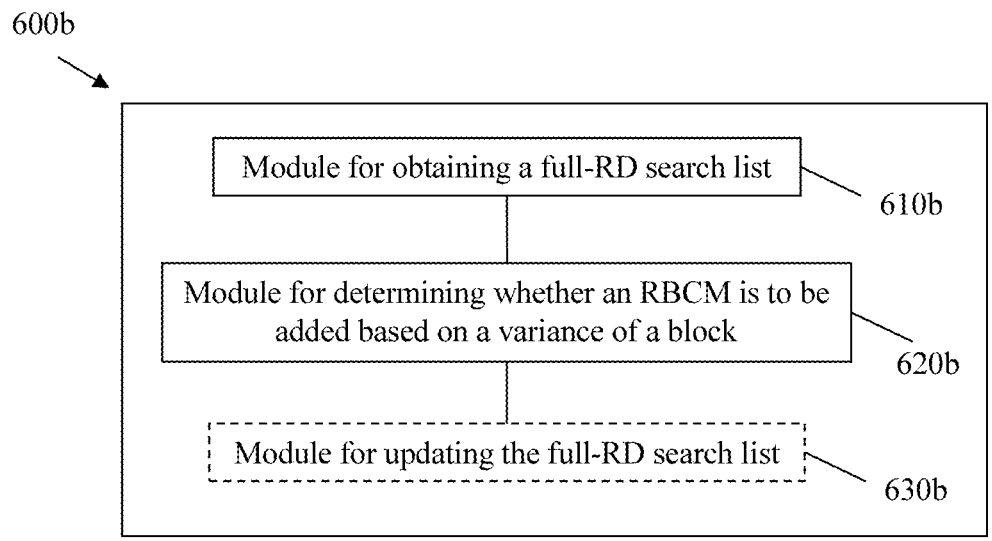

FIG. 6*b* illustrates an embodiment of an apparatus 600*b*, which may be a video encoder (e.g. the video encoder 10). This apparatus, which includes various function modules, e.g. blocks 610*b*, 620*b* (and optionally 630*b*), is capable of implementing the algorithm illustrated by FIG. 6*a*. Detailed discussion of functions of these modules may be directed to relevant parts more fully described for FIG. 6*a*.

Figure 7A:
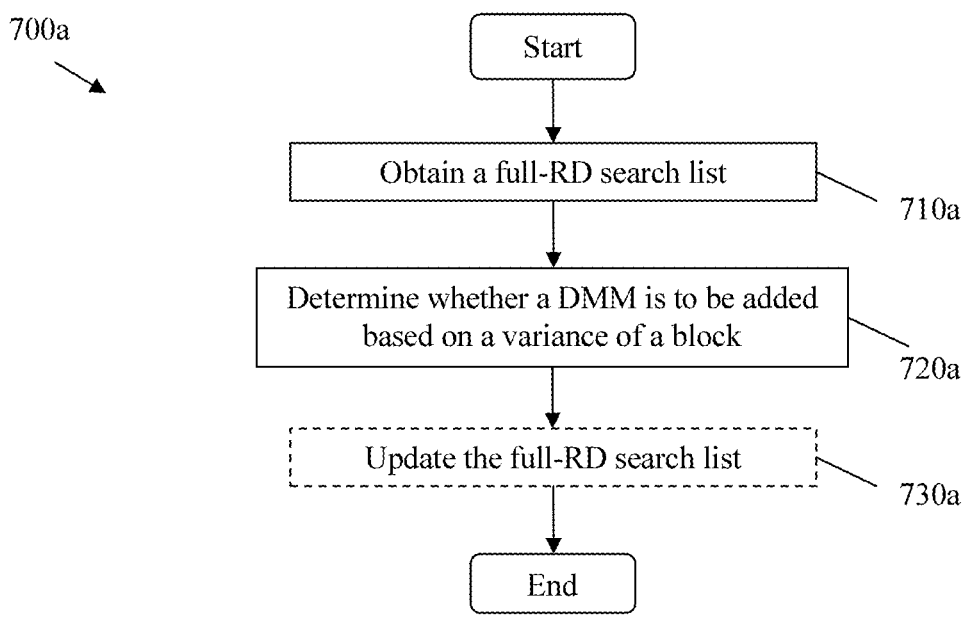
FIG. 7a illustrates another embodiment of a mode selection method.

FIG. 7*a* illustrates another embodiment of a mode selection method 700*a*, which may be implemented on an encoding side comprising a video encoder (e.g. the video encoder 10). This method may be applied for depth intra coding.

Step 710*a*, a full-RD search list is obtained.

Step 720*a*, a determination is made as to whether a DMM is to be added into the full-RD search list (e.g. a DMM is selected as a candidate mode) based on a variance of a current block.

Optionally, in Step 730*a*, the full-RD search list may be updated in accordance with the determination result.

A more detailed description of the embodiment or its variations illustrated by FIG. 7*a* (which concerns DMM) may be referred to the detailed description related with FIG. 6*a* (which concerns RBCM instead of DMM in the same regard) more fully described above. It is to be understood to a person ordinarily skilled in the art that various considerations of the embodiments concerning RBCM related with FIG. 6*a* apply well to the embodiments concerning DMM related with FIG. 7*a* without losing generality.

It is understood by a person ordinarily skilled in the art that the algorithm illustrated by FIG. 7*a* may be implemented in a video encoder. The video encoder may include necessary computing resource, e.g. a processor, and necessary storage resource, e.g. a memory. The video encoder may also include necessary function modules to implement the algorithm. The video encoder may be a graphics processing unit (GPU) provided by vendors like Nvidia and AMD. Each of the various function modules in the video encoder may be separately implemented in a chip module in a GPU.

Figure 7B:
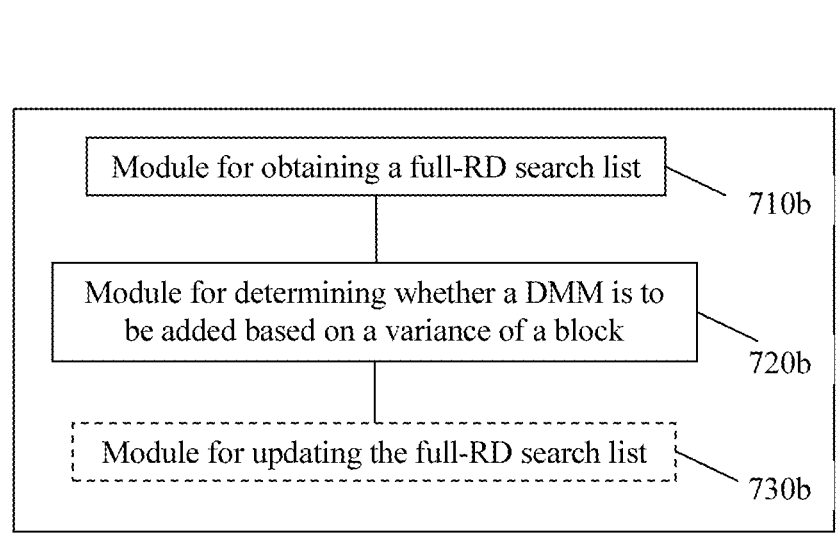

FIG. 7*b* illustrates an embodiment of an apparatus 700*b*, which may be a video encoder (e.g. the video encoder 10). This apparatus, which includes various function modules, e.g. blocks 710*b*, 720*b* (and optionally 730*b*), is capable of implementing the algorithm illustrated by FIG. 7*a*. Detailed discussion of functions of these modules may be directed to relevant parts more fully described for FIG. 7*a*.

Figure 8A:
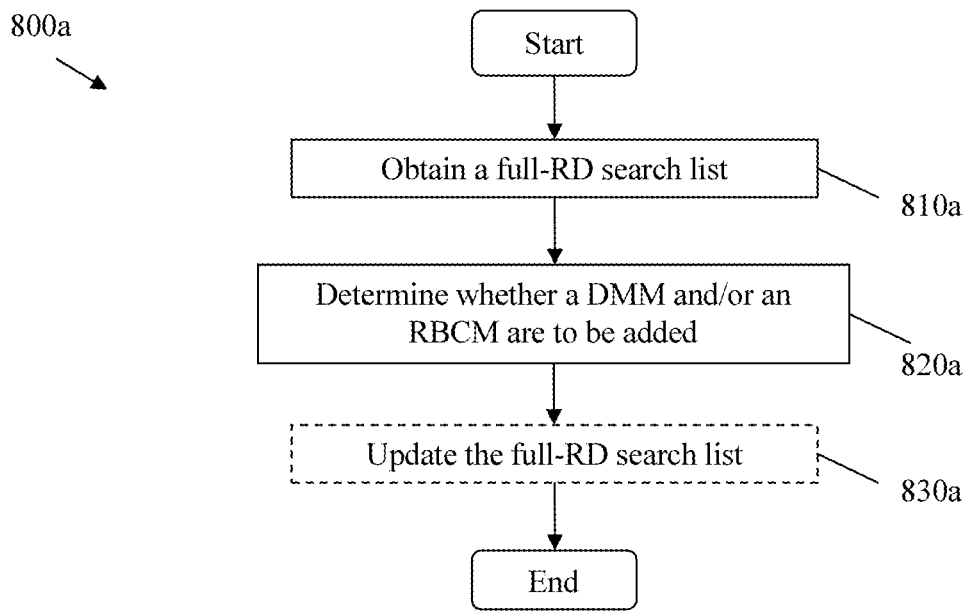
FIG. 8a illustrates another embodiment of a mode selection method.

FIG. 8*a* illustrates another embodiment of a mode selection method 800*a*, which may be implemented on an encoding side comprising a video encoder (e.g. the video encoder 10). This method may be applied for depth intra coding.

Step 810*a*, a full-RD search list is obtained. A more detailed description of step 810*a* may be referred to the detailed description of step 510*a* more fully described above.

Step 820*a*, a determination is made as to whether a DMM and/or an RBCM are to be added into the full-RD search list (e.g. a DMM and/or an RBCM are selected as a candidate mode) based on a decision condition.

The decision condition may base on a variance of the current block and/or a checking whether the first mode in the full-RD search list is a flat coding mode, e.g. a planar mode, a DC mode. The decision condition may also based on at least one or any combination of the following conditions:

The first mode or second mode in the full-RD search list is not a planar mode;
The first mode or second mode in the full-RD search list is not a DC mode;
A variance of the current block is not 0;
A variance of the current block is not 1;
A variance of the current block variance is great than a threshold;
The full-RD search list does not include a planar mode;
The full-RD search list does not include a DC mode.

Optionally, in step 830*a*, the full-RD search list may be updated in accordance with the determination result. A more detailed description of step 830*a* may be referred to the detailed description of steps 530*a*/630*a*/730*a* more fully described above.

A more detailed description of the embodiment or its variations illustrated by FIG. 8*a* may be referred to the detailed description related with FIGS. 5*a*-7*a* more fully described above. It is to be understood to a person ordinarily skilled in the art that various considerations of the embodiments related with FIGS. 5*a*-7*a* apply well to the embodiments related with FIG. 8*a* without losing generality.

It is understood by a person ordinarily skilled in the art that the algorithm illustrated by FIG. 8*a* may be implemented by a video encoder. The video encoder may include necessary computing resource, e.g. a processor, and necessary storage resource, e.g. a memory. The video encoder may also include necessary function modules to implement the algorithm. The video encoder may be a graphics processing unit (GPU) provided by vendors like Nvidia and AMD. Each of the various function modules in the video encoder may be separately implemented in a chip module in a GPU.

Figure 8B:
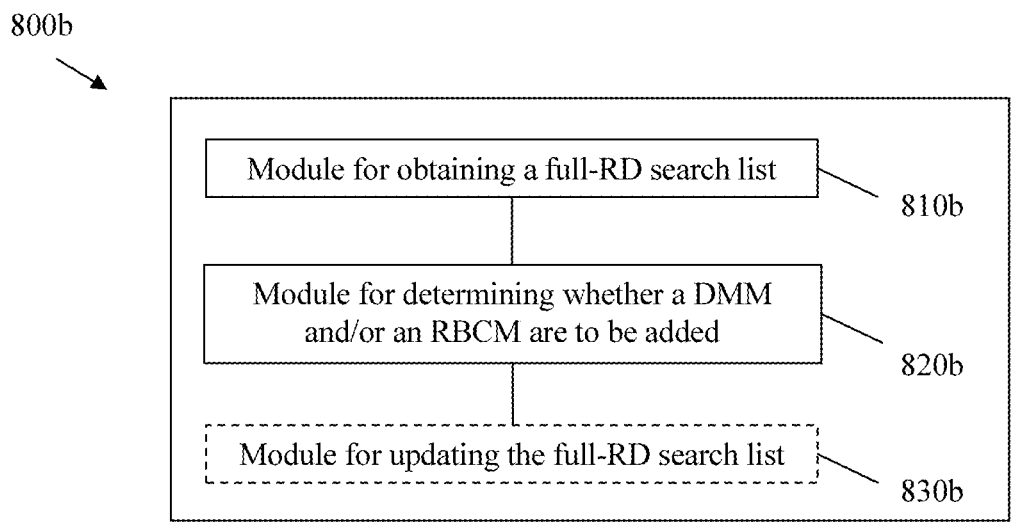

FIG. 8*b* illustrates an embodiment of an apparatus 800*b*, which may be a video encoder (e.g. the video encoder 10). This apparatus, which includes various function modules, e.g. blocks 810*b*, 820*b* (and optionally 830*b*), is capable of implementing the algorithm illustrated by FIG. 8*a*. Detailed discussion of functions of these modules may be directed to relevant parts more fully described for FIG. 8*a*.

As aforementioned, the full-RD search list may include an ordered list of most possible modes (MPMs). In various embodiments of this disclosure, these MPMs may be selected from a plurality of intra prediction modes (IPMs), thus represent candidates which are most possible to be selected as the best mode for coding the current block of a depth map. In a case that the MPMs include a flat coding mode, e.g. a planar mode, a DC mode, at a priority position, e.g. the first position and/or the second position, the region of the current block may well be a flat region, thus making choosing DMM or RBCM for coding the current block less likely. In this case, avoiding adding DMM and/or RBCM into the full-RD search list may be justified for complexity simplification.

In various embodiments of this disclosure, a variance of the current block of a depth map may be checked, e.g. comparing the variance with a threshold, 0, or 1. In a case that the region of the current block may well be a flat region based on the variance, avoiding adding DMM and/or RBCM into the full-RD search list may be justified for complexity simplification.

In the above embodiments, DMM and RBCM can be determined to be added in a full-RD calculation in separated way or a combined way. In a separated way, DMM or RBCM is determined whether to be added in a full-RD calculation respectively. In a combined way, DMM may be determined before or after the determination of RBCM.

In the above embodiments, DMM and RBCM are examples standing for depth coding mode beyond the reference coding modes in HEVC. The presented invention can be further applied by a person ordinarily skilled in the art to any other depth coding modes which are suitable for coding a depth region boundary.

FIG. 9 illustrates an experimental result of an application of the rationale of the mode selection method described above.

It is noted that, DMM/RBCM for depth intra coding may significantly improve the coding efficiency in terms of bit saving compared with reference intra prediction modes. However, the additional DMM/RBCM may also incur considerable additional computation and encoding time compared with a reference design without DMM/RBCM. It is desirable yet challenging to reduce the computation without hurting performance gain introduced by DMM/RBCM. In this disclosure, as exemplified by FIG. 9, embodiments disclosed herein may successfully achieve almost 24% encoding time reduction with negligible performance loss.

It is noted that following new features apply well in various embodiments of this disclosure:

1. Calculate a variance of a current block and determine whether DMM/RBCM may be selected in a full-RD search list.

2. Determine whether RBCM may be selected in a full-RD search list by checking the first mode or second mode in the full-RD search list is a planar mode or a DC mode.

3. Determine whether DMM/RBCM may be selected in a full-RD search list by combine calculating a variance of current block and/or checking whether the first mode in the full-RD search list is a flat coding mode.

4. The condition to be used to determine whether DMM/RBCM may be selected in a full-RD search list can be listed as any one or any combination of the following conditions:
   The first mode or second mode in the full-RD search list is not a planar mode;
   The first mode or second mode in the full-RD search list is not a DC mode;
   A variance of the current block is not 0;
   A variance of the current block is not 1;
   A variance of the current block variance is great than a threshold;
   The full-RD search list does not include a planar mode;
   The full-RD search list does not include a DC mode.

5. Determine whether DMM/RBCM may be selected in a full-RD search list based on a MPM mode.

In the following some examples are provided.

First Example

According to a first example there is provided a method of prediction mode selection for coding a block of a depth map, the method comprises:
   obtaining an ordered list of coding modes, wherein the ordered list coding modes comprises a plurality of coding modes; and
   determining whether a region boundary chain mode (RBCM) is to be added into the ordered list of coding modes in accordance with a decision condition.

In some embodiments, the ordered list of coding modes is provided for candidates used for coding of the block of the depth map.

In some embodiments, the decision condition is based on at least one of the following:
   at least one coding mode of the ordered list of coding modes;
   a mode capable of being used for coding of a depth block;
   size information of the block of the depth map;
   order of the ordered list of coding modes; and
   an RBCM enable/disable option.

In some embodiments, the decision condition is based on at least one of the following:
   a checking of a priority mode of the ordered list of coding modes;
   a checking of the first mode of the ordered list of coding modes;
   a checking of the second mode of the ordered list of coding modes;
   a checking of a variance of the block of the depth map;
   a checking of a variance of the block of the depth map versus a threshold;
   whether a priority mode of the ordered list of coding modes is a flat coding mode;
   whether the first mode of the ordered list of coding modes is a flat coding mode;
   whether the second mode of the ordered list of coding modes is a flat coding mode;
   whether a variance of the block of the depth map is 0;
   whether a variance of the block of the depth map is 1;
   whether a variance of the block of the depth map is greater than a threshold;
   whether a variance of the block of the depth map is smaller than a threshold; and
   whether the ordered list of coding modes include a flat coding mode.

In some embodiments, the flat coding mode is any of the following: a planar mode, and a DC mode.

In some embodiments, the size information of the block of the depth map comprises at least one of the following: a range of the size of the block, a width of the block, and a height of the block.

In some embodiments, the size information of the block of the depth map comprises at least one of the following: the size of the block is with the range of [4,32], and the width of the block is equal to the height of the block.

In some embodiments, the method further comprises:
   calculating a rate-distortion cost for each entry in the ordered list of coding modes after the determining step; and
   selecting a coding mode from the ordered list of coding modes with a minimum calculated rate-distortion cost, wherein the selected coding mode with the minimum calculated rate-distortion cost is applied for coding of the block of the depth map.

In some embodiments, the plurality of coding modes in the ordered list of coding modes includes a plurality of most probable modes (MPMs), and the MPMs comprise at least one of the following: a planar mode, a DC mode, and a directional intra prediction mode.

Second Example

According to a second example there is provided an apparatus, comprising at least one processor and at least one memory including computer program code, the at least one memory and the computer program code configured to, with the at least one processor, cause the apparatus to:
   obtain an ordered list of coding modes, wherein the ordered list coding modes comprises a plurality of coding modes; and
   determine whether a region boundary chain mode (RBCM) is to be added into the ordered list of coding modes in accordance with a decision condition.

A variation of the second example is an apparatus, comprising:

means/module for obtain an ordered list of coding modes, wherein the ordered list coding modes comprises a plurality of coding modes; and means/module for determine whether a region boundary chain mode (RBCM) is to be added into the ordered list of coding modes in accordance with a decision condition.

Another variation of the second example is a computer program product including one or more sequences of one or more instructions which, when executed by one or more processors, cause an apparatus to at least perform the following:

obtaining an ordered list of coding modes, wherein the ordered list coding modes comprises a plurality of coding modes; and determining whether a region boundary chain mode (RBCM) is to be added into the ordered list of coding modes in accordance with a decision condition.

In some embodiments, the ordered list of coding modes is provided for candidates used for coding of a block of a depth map.

In some embodiments, the decision condition is based on at least one of the following:
- at least one coding mode of the ordered list of coding modes;
- a mode capable of being used for coding of a depth block;
- size information of a block of a depth map;
- order of the ordered list of coding modes; and
- an RBCM enable/disable option.

In some embodiments, the decision condition is based on at least one of the following:
- a checking of a priority mode of the ordered list of coding modes;
- a checking of the first mode of the ordered list of coding modes;
- a checking of the second mode of the ordered list of coding modes;
- a checking of a variance of a block of a depth map;
- a checking of a variance of a block of a depth map versus a threshold;
- whether a priority mode of the ordered list of coding modes is a flat coding mode;
- whether the first mode of the ordered list of coding modes is a flat coding mode;
- whether the second mode of the ordered list of coding modes is a flat coding mode;
- whether a variance of a block of a depth map is 0;
- whether a variance of a block of a depth map is 1;
- whether a variance of a block of a depth map is greater than a threshold;
- whether a variance of a block of a depth map is smaller than a threshold; and
- whether the ordered list of coding modes include a flat coding mode.

In some embodiments, the flat coding mode is any of the following: a planar mode, and a DC mode.

In some embodiments, the size information of a block of a depth map comprises at least one of the following: a range of the size of the block, a width of the block, and a height of the block.

In some embodiments, the size information of a block of a depth map comprises at least one of the following: the size of the block is with the range of [4,32], and the width of the block is equal to the height of the block.

In some embodiments, the apparatus is further caused to:
calculate a rate-distortion cost for each entry in the ordered list of coding modes after whether the RBCM is to be added into the ordered list of coding modes is determined; and
select a coding mode from the ordered list of coding modes with a minimum calculated rate-distortion cost, wherein the selected coding mode with the minimum calculated rate-distortion cost is applied for coding of the block of the depth map.

In some embodiments, the apparatus further comprises:
module or means for calculating a rate-distortion cost for each entry in the ordered list of coding modes after whether the RBCM is to be added into the ordered list of coding modes is determined; and
module or means for selecting a coding mode from the ordered list of coding modes with a minimum calculated rate-distortion cost, wherein the selected coding mode with the minimum calculated rate-distortion cost is applied for coding of the block of the depth map.

In some embodiments, the plurality of coding modes in the ordered list of coding modes includes a plurality of most probable modes (MPMs), and the MPMs comprise at least one of the following: a planar mode, a DC mode, and a directional intra prediction mode.

In some embodiments, the apparatus is a video encoder.

Third Example

According to a third example there is provided a method of prediction mode selection for coding a block of a depth map, the method comprising:

obtaining an ordered list of coding modes, wherein the ordered list of coding modes comprises a plurality of coding modes; and determining whether a block partition mode (BPM) is to be added into the ordered list of coding modes in accordance with a decision condition based on a variance of the block of the depth map.

In some embodiments, the ordered list of coding modes is provided for candidates used for coding of the block of the depth map.

In some embodiments, the BPM comprises at least one of the following: a depth modeling mode (DMM), and a region boundary chain mode (RBCM).

In some embodiments, the decision condition is further based on at least one of the following:
- at least one coding mode of the ordered list of coding modes;
- a mode capable of being used for coding of a depth block;
- size information of the block of the depth map;
- order of the ordered list of coding modes;
- a DMM enable/disable option; and
- an RBCM enable/disable option.

In some embodiments, the decision condition is further based on at least one of the following:
- a checking of a priority mode of the ordered list of coding modes;
- a checking of the first mode of the ordered list of coding modes;
- a checking of the second mode of the ordered list of coding modes;
- whether a priority mode of the ordered list of coding modes is a flat coding mode;
- whether the first mode of the ordered list of coding modes is a flat coding mode;
- whether the second mode of the ordered list of coding modes is a flat coding mode; and whether the ordered list of coding modes include a flat coding mode.

In some embodiments, the decision condition is based on at least one of the following:
- a checking of a variance of the block of the depth map versus a threshold;
- whether a variance of the block of the depth map is 0;
- whether a variance of the block of the depth map is 1;
- whether a variance of the block of the depth map is greater than a threshold; and
- whether a variance of the block of the depth map is smaller than a threshold.

In some embodiments, the flat coding mode is any of the following: a planar mode, and a DC mode.

In some embodiments, the size information of the block of the depth map comprises at least one of the following: a range of the size of the block, a width of the block, and a height of the block.

In some embodiments, the size information of the block of the depth map comprises at least one of the following: the size of the block is with the range of [4,32], and the width of the block is equal to the height of the block.

In some embodiments, the method further comprising:
calculating a rate-distortion cost for each entry in the ordered list of coding modes after the determining step; and
selecting a coding mode from the ordered list of coding modes with a minimum calculated rate-distortion cost, wherein the selected coding mode with the minimum calculated rate-distortion cost is applied for coding of the block of the depth map.

In some embodiments, the plurality of coding modes in the ordered list of coding modes includes a plurality of most probable modes (MPMs), and the MPMs comprise at least one of the following: a planar mode, a DC mode, and a directional intra prediction mode.

In some embodiments, the threshold is predefined in accordance with a quantization parameter used in depth map coding.

In some embodiments, the threshold is calculated using an approximate formula in accordance with a quantization parameter used in depth map coding.

In some embodiments, the approximate formula includes at least one of the following operations: shift, multiply, add, and minus.

In some embodiments, the approximate formula is represented as:

$$threshold=\max((CU\_depth\_QP*a)>>b)-c,d),$$

where CU_depth_QP stands for the quantization parameter, a, b, c, d are real numbers, and >> stands for shift operation.

In some embodiments, the method further comprising:
when a variance of the block is not smaller than a threshold, adding the BPM into the ordered list of coding modes.

In some embodiments, the method further comprising:
when a variance of the block is smaller than a threshold, avoiding adding the BPM into the ordered list of coding modes.

Fourth Example

According to a fourth example there is provided an apparatus, comprising at least one processor and at least one memory including computer program code, the at least one memory and the computer program code configured to, with the at least one processor, cause the apparatus to:
obtain an ordered list of coding modes, wherein the ordered list of coding modes comprises a plurality of coding modes; and
determine whether a block partition mode (BPM) is to be added into the ordered list of coding modes in accordance with a decision condition based on a variance of a block of a depth map.

A variation of the fourth example is an apparatus, comprising:
module or means for obtaining an ordered list of coding modes, wherein the ordered list of coding modes comprises a plurality of coding modes; and
module or means for determine whether a block partition mode (BPM) is to be added into the ordered list of coding modes in accordance with a decision condition based on a variance of a block of a depth map.

Another variation of the fourth example is a computer program product including one or more sequences of one or more instructions which, when executed by one or more processors, cause an apparatus to at least perform the following:
obtaining an ordered list of coding modes, wherein the ordered list of coding modes comprises a plurality of coding modes; and
determining whether a block partition mode (BPM) is to be added into the ordered list of coding modes in accordance with a decision condition based on a variance of a block of a depth map.

In some embodiments, the ordered list of coding modes is provided for candidates used for coding of a block of a depth map.

In some embodiments, the BPM comprises at least one of the following: a depth modeling mode (DMM), and a region boundary chain mode (RBCM).

In some embodiments, the decision condition is further based on at least one of the following:
- at least one coding mode of the ordered list of coding modes;
- a mode capable of being used for coding of a depth block;
- size information of a block of a depth map;
- order of the ordered list of coding modes;
- a DMM enable/disable option; and
- an RBCM enable/disable option.

In some embodiments, the decision condition is further based on at least one of the following:
- a checking of a priority mode of the ordered list of coding modes;
- a checking of the first mode of the ordered list of coding modes;
- a checking of the second mode of the ordered list of coding modes;
- whether a priority mode of the ordered list of coding modes is a flat coding mode;
- whether the first mode of the ordered list of coding modes is a flat coding mode;
- whether the second mode of the ordered list of coding modes is a flat coding mode; and
- whether the ordered list of coding modes include a flat coding mode.

In some embodiments, the decision condition is based on at least one of the following:
- a checking of a variance of a block of a depth map versus a threshold;
- whether a variance of a block of a depth map is 0;
- whether a variance of a block of a depth map is 1;
- whether a variance of a block of a depth map is greater than a threshold; and whether a variance of a block of a depth map is smaller than a threshold.

In some embodiments, the flat coding mode is any of the following: a planar mode, and a DC mode.

In some embodiments, the size information of a block of a depth map comprises at least one of the following: a range of the size of the block, a width of the block, and a height of the block.

In some embodiments, the size information of a block of a depth map comprises at least one of the following: the size of the block is with the range of [4,32], and the width of the block is equal to the height of the block.

In some embodiments, the apparatus is further caused to:
calculate a rate-distortion cost for each entry in the ordered list of coding modes after whether the BPM is to be added into the ordered list of coding modes is determined; and select a coding mode from the ordered list of coding modes with a minimum calculated rate-distortion cost, wherein the selected coding mode with the minimum calculated rate-distortion cost is applied for coding of the block of the depth map.

In some embodiments, the apparatus further comprises:
module or means for calculating a rate-distortion cost for each entry in the ordered list of coding modes after whether the BPM is to be added into the ordered list of coding modes is determined; and module or means for selecting a coding mode from the ordered list of coding modes with a minimum calculated rate-distortion cost, wherein the selected coding mode with the minimum calculated rate-distortion cost is applied for coding of the block of the depth map.

In some embodiments, the plurality of coding modes in the ordered list of coding modes includes a plurality of most probable modes (MPMs), and the MPMs comprise at least one of the following: a planar mode, a DC mode, and a directional intra prediction mode.

In some embodiments, the threshold is predefined in accordance with a quantization parameter used in depth map coding.

In some embodiments, the threshold is calculated using an approximate formula in accordance with a quantization parameter used in depth map coding.

In some embodiments, the approximate formula includes at least one of the following operations: shift, multiply, add, and minus.

In some embodiments, the approximate formula is represented as:

$$\text{threshold}=\max((CU\_depth\_QP*a)>>b)-c,d),$$

where CU_depth_QP stands for the quantization parameter, a, b, c, d are real numbers, and >> stands for shift operation.

In some embodiments, the apparatus is further caused to:
when a variance of the block is not smaller than a threshold, add the BPM into the ordered list of coding modes.

In some embodiments, the apparatus is further caused to:
when a variance of the block is smaller than a threshold, avoid adding the BPM into the ordered list of coding modes.

In some embodiments, the apparatus is a video encoder.

Fifth Example

According to a fifth example there is provided a method of prediction mode selection for coding a block of a depth map, the method comprising:

obtaining an ordered list of coding modes, wherein the ordered list of coding modes comprises a plurality of coding modes, each of the plurality of coding modes is capable of being used for coding of the block; and in a case that the first mode of the ordered list of coding modes is not a flat coding mode and a variance of the block is not smaller than a threshold, adding a depth modeling mode (DMM) into the ordered list of coding modes.

In some embodiments, the method further comprises:
in the case that the first mode of the ordered list of coding modes is not a flat coding mode and the variance of the block is not less than the threshold, adding a region boundary chain mode (RBCM) into the ordered list of coding modes.

Sixth Example

According to a sixth example there is provided an apparatus, comprising at least one processor and at least one memory including computer program code, the at least one memory and the computer program code configured to, with the at least one processor, cause the apparatus to:

obtain an ordered list of coding modes, wherein the ordered list of coding modes comprises a plurality of coding modes, each of the plurality of coding modes is capable of being used for coding of a block of a depth map; and add a depth modeling mode (DMM) into the ordered list of coding modes in a case that the first mode of the ordered list of coding modes is not a flat coding mode and a variance of the block is not smaller than a threshold.

A variation of the sixth example is a computer program product including one or more sequences of one or more instructions which, when executed by one or more processors, cause an apparatus to at least perform the following:

obtaining an ordered list of coding modes, wherein the ordered list of coding modes comprises a plurality of coding modes, each of the plurality of coding modes is capable of being used for coding of a block of a depth map; and adding a depth modeling mode (DMM) into the ordered list of coding modes in a case that the first mode of the ordered list of coding modes is not a flat coding mode and a variance of the block is not smaller than a threshold.

In some embodiments, the apparatus is further caused to:
add a region boundary chain mode (RBCM) into the ordered list of coding modes in the case that the first mode of the ordered list of coding modes is not a flat coding mode and the variance of the block is not less than the threshold.

Another variation of the sixth example is an apparatus, comprising:

module or means for obtaining an ordered list of coding modes, wherein the ordered list of coding modes comprises a plurality of coding modes, each of the plurality of coding modes is capable of being used for coding of a block of a depth map; and module or means for adding a depth modeling mode (DMM) into the ordered list of coding modes in a case that the first mode of the ordered list of coding modes is not a flat coding mode and a variance of the block is not smaller than a threshold.

In some embodiments, the apparatus further comprises:
module or means for adding a region boundary chain mode (RBCM) into the ordered list of coding modes in the case that the first mode of the ordered list of coding modes is not a flat coding mode and the variance of the block is not less than the threshold.

In some embodiments, the apparatus is a video encoder.

Seventh Example

According to a seventh example there is provided a method of prediction mode selection for coding a block of a depth map, the method comprising:

obtaining an ordered list of coding modes, wherein the ordered list of coding modes comprises a plurality of coding modes, each of the plurality of coding modes is capable of being used for coding of the block; and in a case that the first mode of the ordered list of coding modes is a flat coding mode or a variance of the block is less than a threshold, excluding a depth modeling mode (DMM) to be added into the ordered list of coding modes.

In some embodiments, the method further comprises:

in the case that the first mode of the ordered list of coding modes is a flat coding mode or the variance of the block is less than the threshold, excluding a region boundary chain mode (RBCM) to be added into the ordered list of coding modes.

Eighth Example

According to an eighth example there is provided an apparatus, comprising at least one processor and at least one memory including computer program code, the at least one memory and the computer program code configured to, with the at least one processor, cause the apparatus to:

obtain an ordered list of coding modes, wherein the ordered list of coding modes comprises a plurality of coding modes, each of the plurality of coding modes is capable of being used for coding of a block of a depth map; and exclude a depth modeling mode (DMM) to be added into the ordered list of coding modes in a case that the first mode of the ordered list of coding modes is a flat coding mode or a variance of the block is less than a threshold.

A variation of the eighth example is a computer program product including one or more sequences of one or more instructions which, when executed by one or more processors, cause an apparatus to at least perform the following:

obtaining an ordered list of coding modes, wherein the ordered list of coding modes comprises a plurality of coding modes, each of the plurality of coding modes is capable of being used for coding of a block of a depth map; and excluding a depth modeling mode (DMM) to be added into the ordered list of coding modes in a case that the first mode of the ordered list of coding modes is a flat coding mode or a variance of the block is less than a threshold.

In some embodiments, the apparatus is further caused to:

exclude a region boundary chain mode (RBCM) to be added into the ordered list of coding modes in the case that the first mode of the ordered list of coding modes is a flat coding mode or the variance of the block is less than the threshold.

Another variation of the eighth example is an apparatus, comprising:

module or means for obtaining an ordered list of coding modes, wherein the ordered list of coding modes comprises a plurality of coding modes, each of the plurality of coding modes is capable of being used for coding of a block of a depth map; and module or means for excluding a depth modeling mode (DMM) to be added into the ordered list of coding modes in a case that the first mode of the ordered list of coding modes is a flat coding mode or a variance of the block is less than a threshold.

In some embodiments, the apparatus further comprises:

module or means for excluding a region boundary chain mode (RBCM) to be added into the ordered list of coding modes in the case that the first mode of the ordered list of coding modes is a flat coding mode or the variance of the block is less than the threshold.

In some embodiments, the apparatus is a video encoder.

Ninth Example

According to a ninth example there is provided a method of prediction mode selection for coding a block of a depth map, the method comprising:

obtaining an ordered list of coding modes, wherein the ordered list of coding modes comprises a plurality of coding modes, each of the plurality of coding modes is capable of being used for coding of the block; and in a case that the first mode of the ordered list of coding modes is not a flat coding mode and a variance of the block is not less than a threshold, adding a region boundary chain mode (RBCM) into the ordered list of coding modes.

Tenth Example

According to a tenth example there is provided an apparatus, comprising at least one processor and at least one memory including computer program code, the at least one memory and the computer program code configured to, with the at least one processor, cause the apparatus to:

obtain an ordered list of coding modes, wherein the ordered list of coding modes comprises a plurality of coding modes, each of the plurality of coding modes is capable of being used for coding of a block of a depth map; and add a region boundary chain mode (RBCM) into the ordered list of coding modes in a case that the first mode of the ordered list of coding modes is not a flat coding mode and a variance of the block is not less than a threshold.

A variation of the tenth example is an apparatus, comprising:

module or means for obtaining an ordered list of coding modes, wherein the ordered list of coding modes comprises a plurality of coding modes, each of the plurality of coding modes is capable of being used for coding of a block of a depth map; and module or means for add a region boundary chain mode (RBCM) into the ordered list of coding modes in a case that the first mode of the ordered list of coding modes is not a flat coding mode and a variance of the block is not less than a threshold.

Another variation of the eighth example is a computer program product including one or more sequences of one or more instructions which, when executed by one or more processors, cause an apparatus to at least perform the following:

obtaining an ordered list of coding modes, wherein the ordered list of coding modes comprises a plurality of coding modes, each of the plurality of coding modes is capable of being used for coding of a block of a depth map; and adding a region boundary chain mode (RBCM) into the ordered list of coding modes in a case that the first mode of the ordered list of coding modes is not a flat coding mode and a variance of the block is not less than a threshold.

In some embodiments, the apparatus is a video encoder.

Eleventh Example

According to an eleventh example there is provided a method of prediction mode selection for coding a block of a depth map, the method comprising:

obtaining an ordered list of coding modes, wherein the ordered list of coding modes comprises a plurality of coding modes;

determining whether a depth modeling mode (DMM) is to be added into the ordered list of coding modes in accordance with a first decision condition; and determining whether a region boundary chain mode (RBCM) is to be added into the ordered list of coding modes in accordance with a second decision condition.

In some embodiments, the method further comprises:

calculating a rate-distortion cost for each entry in the ordered list of coding modes after the determining steps; and applying a coding mode selected from the ordered list of coding modes with a minimum calculated rate-distortion cost for coding of the block.

In some embodiments, the ordered list of coding modes is provided for candidates used for coding of the block of the depth map.

In some embodiments, the second decision condition is based on at least one of the following:

at least one coding mode of the ordered list of coding modes;
a mode capable of being used for coding of a depth block;
size information of the block of the depth map;
order of the ordered list of coding modes; and
an RBCM enable/disable option.

In some embodiments, the first (and/or second) decision condition is based on at least one of the following:

a checking of a priority mode of the ordered list of coding modes;
a checking of the first mode of the ordered list of coding modes;
a checking of the second mode of the ordered list of coding modes;
a checking of a variance of the block of the depth map;
a checking of a variance of the block of the depth map versus a threshold;
whether a priority mode of the ordered list of coding modes is a flat coding mode;
whether the first mode of the ordered list of coding modes is a flat coding mode;
whether the second mode of the ordered list of coding modes is a flat coding mode;
whether a variance of the block of the depth map is 0;
whether a variance of the block of the depth map is 1;
whether a variance of the block of the depth map is greater than a threshold;
whether a variance of the block of the depth map is smaller than a threshold; and
whether the ordered list of coding modes include a flat coding mode.

In some embodiments, the flat coding mode is any of the following: a planar mode, and a DC mode.

In some embodiments, the size information of the block of the depth map comprises at least one of the following: a range of the size of the block, a width of the block, and a height of the block.

In some embodiments, the size information of the block of the depth map comprises at least one of the following: the size of the block is with the range of [4,32], and the width of the block is equal to the height of the block.

In some embodiments, the plurality of coding modes in the ordered list of coding modes includes a plurality of most probable modes (MPMs), and the MPMs comprise at least one of the following: a planar mode, a DC mode, and a directional intra prediction mode.

Twelfth Example

According to a twelfth example there is provided an apparatus, comprising at least one processor and at least one memory including computer program code, the at least one memory and the computer program code configured to, with the at least one processor, cause the apparatus to:

obtain an ordered list of coding modes, wherein the ordered list of coding modes comprises a plurality of coding modes;

determine whether a depth modeling mode (DMM) is to be added into the ordered list of coding modes in accordance with a first decision condition; and determine whether a region boundary chain mode (RBCM) is to be added into the ordered list of coding modes in accordance with a second decision condition.

A variation of the twelfth example is a computer program product including one or more sequences of one or more instructions which, when executed by one or more processors, cause an apparatus to at least perform the following:

obtaining an ordered list of coding modes, wherein the ordered list of coding modes comprises a plurality of coding modes;

determining whether a depth modeling mode (DMM) is to be added into the ordered list of coding modes in accordance with a first decision condition; and determining whether a region boundary chain mode (RBCM) is to be added into the ordered list of coding modes in accordance with a second decision condition.

In some embodiments, the apparatus is further caused to:

calculate a rate-distortion cost for each entry in the ordered list of coding modes after the determining steps; and apply a coding mode selected from the ordered list of coding modes with a minimum calculated rate-distortion cost for coding of a block of a depth map.

A variation of the twelfth example is an apparatus, comprising:

module or means for obtaining an ordered list of coding modes, wherein the ordered list of coding modes comprises a plurality of coding modes;

module or means for determining whether a depth modeling mode (DMM) is to be added into the ordered list of coding modes in accordance with a first decision condition; and module or means for determining whether a region boundary chain mode (RBCM) is to be added into the ordered list of coding modes in accordance with a second decision condition.

In some embodiments, the apparatus further comprises:

module or means for calculating a rate-distortion cost for each entry in the ordered list of coding modes after the determining steps; and module or means for applying a coding mode selected from the ordered list of coding modes with a minimum calculated rate-distortion cost for coding of a block of a depth map.

In some embodiments, the ordered list of coding modes is provided for candidates used for coding of a block of a depth map.

In some embodiments, the second decision condition is based on at least one of the following:

at least one coding mode of the ordered list of coding modes;
a mode capable of being used for coding of a depth block;

size information of a block of a depth map;
order of the ordered list of coding modes; and
an RBCM enable/disable option.

In some embodiments, the first (and/or second) decision condition is based on at least one of the following:
  a checking of a priority mode of the ordered list of coding modes;
  a checking of the first mode of the ordered list of coding modes;
  a checking of the second mode of the ordered list of coding modes;
  a checking of a variance of a block of a depth map;
  a checking of a variance of a block of a depth map versus a threshold;
  whether a priority mode of the ordered list of coding modes is a flat coding mode;
  whether the first mode of the ordered list of coding modes is a flat coding mode;
  whether the second mode of the ordered list of coding modes is a flat coding mode;
  whether a variance of a block of a depth map is 0;
  whether a variance of a block of a depth map is 1;
  whether a variance of a block of a depth map is greater than a threshold;
  whether a variance of a block of a depth map is smaller than a threshold; and
  whether the ordered list of coding modes include a flat coding mode.

In some embodiments, the flat coding mode is any of the following: a planar mode, and a DC mode.

In some embodiments, the size information of a block of a depth map comprises at least one of the following: a range of the size of the block, a width of the block, and a height of the block.

In some embodiments, the size information of a block of a depth map comprises at least one of the following: the size of the block is with the range of [4,32], and the width of the block is equal to the height of the block.

In some embodiments, the plurality of coding modes in the ordered list of coding modes includes a plurality of most probable modes (MPMs), and the MPMs comprise at least one of the following: a planar mode, a DC mode, and a directional intra prediction mode.

In some embodiments, the apparatus is a video encoder.

In the above, some embodiments may be related to coding/decoding methods or tools having inter-component dependency, such as depth-based texture coding/decoding or prediction tools. It needs to be understood that embodiments may not be specific to the described coding/decoding methods but could be realized with any similar coding/decoding methods or tools.

In the above, example embodiments may be described with the help of syntax of the bitstream. It needs to be understood, however, that the corresponding structure and/or computer program may reside at the encoder for generating the bitstream and/or at the decoder for decoding the bitstream. Likewise, where the example embodiments may be described with reference to an encoder, it needs to be understood that the resulting bitstream and the decoder have corresponding elements in them. Likewise, where the example embodiments may be described with reference to a decoder, it needs to be understood that the encoder has structure and/or computer program for generating the bitstream to be decoded by the decoder.

At least some of the features, methods, or codecs, such as the methods described in aforementioned embodiments may be implemented on any general-purpose electronic device, such as a computer system or component electronic apparatus with sufficient processing power, memory resources, and network throughput capability to handle the necessary workload placed upon it. The electronic device may for example be a mobile terminal or user equipment of a wireless communication system. However, it would be appreciated that embodiments of the disclosure may be implemented within any electronic device or apparatus which may require encoding and decoding or encoding or decoding video images.

Figure 10:
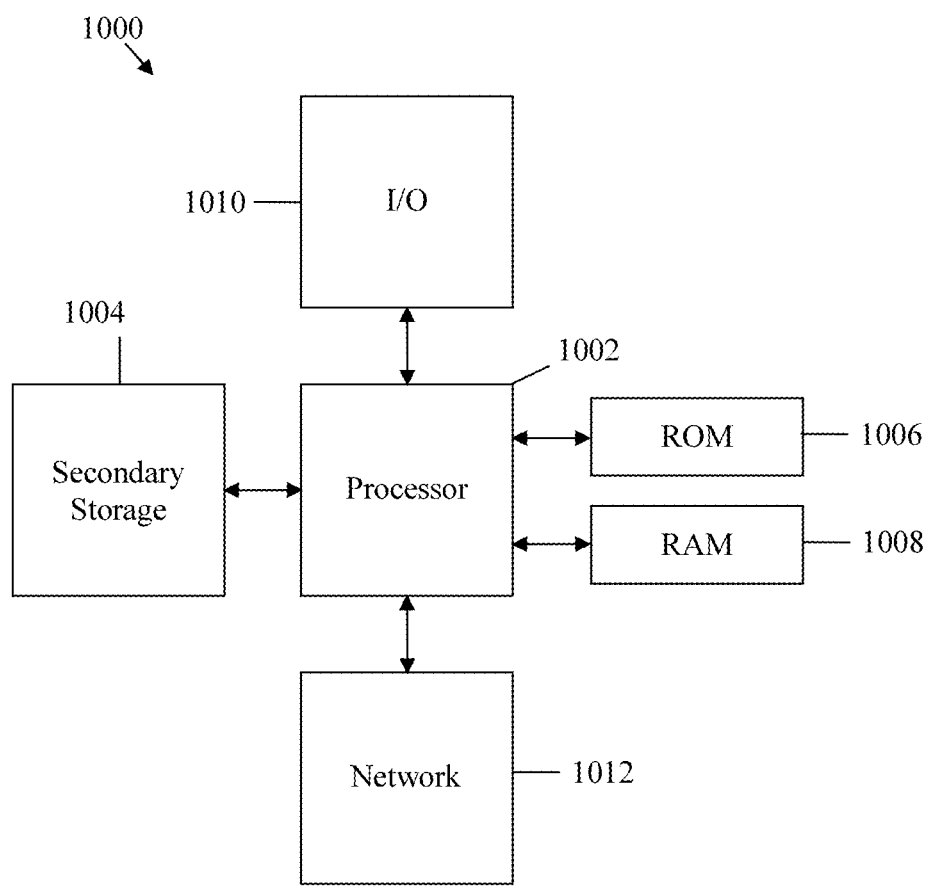
FIG. 10 is a schematic diagram of an embodiment of an electronic device.

FIG. 10 illustrates a typical, general-purpose electronic device 1000 suitable for implementing one or more embodiments of the components disclosed herein. The general-purpose electronic device 1000 includes a processor 1002 (which may be referred to as a central processing unit or CPU) that is in communication with memory devices including secondary storage 1004, read only memory (ROM) 1006, random access memory (RAM) 10010, input/output (I/O) devices 1010, and optionally a network connectivity devices 1012. The processor 1002 may be implemented as one or more CPU chips, cores (e.g., a multi-core processor), field-programmable gate arrays (FPGAs), application specific integrated circuits (ASICs), and/or digital signal processors (DSPs), and/or may be part of one or more ASICs. The processor 1002 may be configured to implement any of the embodiments of a mode selection aforementioned. The processor 1002 may be implemented using hardware or a combination of hardware and software.

The secondary storage 1004 is typically comprised of one or more disk drives or tape drives and is used for non-volatile storage of data and as an over-flow data storage device if RAM 10010 is not large enough to hold all working data. Secondary storage 1004 may be used to store programs that are loaded into RAM 10010 when such programs are selected for execution. The ROM 1006 is used to store instructions and perhaps data that are read during program execution. ROM 1006 is a non-volatile memory device that typically has a small memory capacity relative to the larger memory capacity of secondary storage 1004. The RAM 10010 is used to store volatile data and perhaps to store instructions. Access to both ROM 1006 and RAM 10010 is typically faster than to secondary storage 1004.

The network connectivity devices 1012 may serve as an output and/or input device of electronic device 1000. The network connectivity devices 1012 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (Wi-MAX), and/or other air interface protocol radio transceiver cards, and other well-known network devices. These network connectivity devices 1012 may enable the processor 1002 to communicate with an Internet and/or one or more intranets and/or one or more client devices. I/O devices 1010 may include a video monitor, liquid crystal display (LCD), touch screen display, or other type of video display for displaying video, and/or may include a video recording device for capturing video. I/O devices 1010 may also include one or more keyboards, mice, or track balls, or other well-known input devices.

It is understood that by programming and/or loading executable instructions onto the electronic device 1000, at least one of the processor 1002, the ROM 1006, and the RAM 10010 are changed, transforming the computer system 1000 in part into a particular machine or apparatus, e.g., an HEVC codec, having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an ASIC, because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. The use of the term "about" means+/−10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method for coding a block of a depth map for a video data, comprising:
   obtaining a first list comprising a plurality of coding modes;
   obtaining a block variance of a block of a depth map for a video data;
   determining if a first coding mode in the first list is not a flat mode and the block variance is greater than a certain threshold value, wherein upon determining that the first coding mode in the first list is not a flat mode and the block variance is greater than a certain threshold value a depth modeling mode is added to the first list;
   coding, by a video encoder, the block of the depth map using a depth modeling mode from the first list; and
   outputting the block of the depth map.

2. The method of claim 1, further comprising:
   updating the first list with adding a region boundary chain mode (RBCM) to obtain a second list upon determining that the block variance is greater than the certain threshold value; and coding the block of the depth map for the video data with a coding mode from the second list.

3. The method of claim 1, further comprising:
   updating the first list with adding a region boundary chain mode (RBCM) to obtain a second list when the block variance is not 0; and coding the block of the depth map for the video data with a coding mode from the second list.

4. The method of claim 1, further comprising:
   updating the first list with adding a region boundary chain mode (RBCM) to obtain a second list when the block variance is not 1; and coding the block of the depth map for the video data with a coding mode from the second list.

5. The method of claim 1, further comprising:
updating the first list with adding the depth modeling mode when the block variance is not 0.

6. The method of claim 1, further comprising:
updating the first list with adding the depth modeling mode when the block variance is not 1.

7. The method of claim 1, wherein the flat mode is at least one of a planar mode and a DC mode.

8. The method of claim 1, wherein the list is a depth intra coding mode list.

9. The method of claim 1, wherein the certain threshold value is predefined in accordance with a quantization parameter.

10. An apparatus for coding a block of a depth map for a video data, comprising:
a non-transitory memory storage comprising instructions; and
one or more processors in communication with the storage, and the one or more processors configure the instructions to:
obtain a block variance of a block of a depth map for a video data;
determine if a first coding mode in the first list is not a flat mode and the block variance is greater than a certain threshold value, wherein upon determining that the first coding mode in the first list is not a flat mode and the block variance is greater than a certain threshold value a depth modeling mode is added to the first list;
code, by a video encoder, the block of the depth map using a depth modeling mode from the first list; and
output the block of the depth map.

11. The apparatus of claim 10, the one or more processors further configure the instructions to:
update the first list with adding a region boundary chain mode (RBCM) to obtain a second list upon determining the block variance is greater than the certain threshold value; and
code the block of the depth map for the video data with a coding mode from the second list.

12. The apparatus of claim 10, the one or more processors further configure the instructions to:
update the first list with adding a region boundary chain mode (RBCM) to obtain a second list upon determining the block variance is not 0; and code the block of the depth map for the video data with a coding mode from the second list.

13. The apparatus of claim 10, the one or more processors further configure the instructions to:
update the first list with adding a region boundary chain mode (RBCM) to obtain a second list when the block variance is not 1; and code the block of the depth map for the video data with a coding mode from the second list.

14. The apparatus of claim 10, the one or more processors further configure the instructions to:
update the first list with adding the depth modeling mode when the block variance is not 0.

15. The apparatus of claim 10, the one or more processors further configure the instructions to:
update the first list with adding the depth modeling mode when the block variance is not 1.

16. The apparatus of claim 10, wherein the flat mode is at least one of a planar mode and a DC mode.

17. The apparatus of claim 10, wherein the list is a depth intra coding mode list.

18. The apparatus of claim 10, wherein the certain threshold value is predefined in accordance with a quantization parameter.

* * * * *

UNITED STATES PATENT AND TRADEMARK OFFICE
CERTIFICATE OF CORRECTION

PATENT NO. : 9,641,853 B2  
APPLICATION NO. : 14/253465  
DATED : May 2, 2017  
INVENTOR(S) : Jianhua Zheng et al.

It is certified that error appears in the above-identified patent and that said Letters Patent is hereby corrected as shown below:

On the Title Page

(73) Assignee: insert --Santa Clara University, Santa Clara, CA (US)--.

Signed and Sealed this
Fifteenth Day of August, 2017

Joseph Matal
*Performing the Functions and Duties of the*
*Under Secretary of Commerce for Intellectual Property and*
*Director of the United States Patent and Trademark Office*